(12) United States Patent
Huang et al.

(10) Patent No.: US 12,076,289 B2
(45) Date of Patent: Sep. 3, 2024

(54) HIP EXOSKELETON

(71) Applicant: North Carolina State University, Raleigh, NC (US)

(72) Inventors: He Huang, Raleigh, NC (US); Ting Zhang, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 644 days.

(21) Appl. No.: 16/637,115

(22) PCT Filed: Sep. 22, 2018

(86) PCT No.: PCT/US2018/052316
§ 371 (c)(1),
(2) Date: Feb. 6, 2020

(87) PCT Pub. No.: WO2019/060791
PCT Pub. Date: Mar. 28, 2019

(65) Prior Publication Data
US 2021/0369533 A1    Dec. 2, 2021

Related U.S. Application Data

(60) Provisional application No. 62/562,227, filed on Sep. 22, 2017.

(51) Int. Cl.
*A61H 3/00* (2006.01)
*A61H 1/02* (2006.01)
(Continued)

(52) U.S. Cl.
CPC ............ *A61H 1/0244* (2013.01); *A61H 3/00* (2013.01); *B25J 9/0006* (2013.01); *B25J 13/088* (2013.01);
(Continued)

(58) Field of Classification Search
CPC .. A61H 3/00; A61H 2003/007; A61H 1/0244; A61H 2201/5061;
(Continued)

(56) References Cited

U.S. PATENT DOCUMENTS

| 5,763,793 A | 6/1998 | Ng et al. |
| 6,269,702 B1 | 8/2001 | Lambson |

(Continued)

FOREIGN PATENT DOCUMENTS

| WO | WO-2017083970 A1 * | 5/2017 | ............... B60K 1/00 |
| WO | WO-2019073407 A1 * | 4/2019 | .............. B25J 13/02 |

OTHER PUBLICATIONS

Wang et al., Design and Control of the Mindwalker Exoskeleton, IEEE Transactions on Neural Systems and Rehabilitation Engineering vol. 23, No. 2, pp. 277-286, Mar. 2015 (Year: 2015).*

(Continued)

*Primary Examiner* — Michael R Reid
*Assistant Examiner* — Tyler A Raubenstraw
(74) *Attorney, Agent, or Firm* — Michael Best & Friedrich LLP

(57) ABSTRACT

An exoskeleton wearable on a body of a human having two legs, the exoskeleton comprising a first HAA joint and a second HAA joint to assist the human with leg abduction and adduction movements that are parallel to a frontal plane, each of the first and the second HAA joints having an actuator, each actuator including a motor and a clutch. The exoskeleton further comprises a sensor system for measuring a combined center of mass of the human and the exoskeleton in the frontal plane and a step width of the human in the frontal plane. The exoskeleton further comprises a controller that outputs adjustment angles for each of the first and the second HAA joints based on the center of mass and the step width. The first and the second HAA joints (Continued)

are respectively rotated based on the respective output adjustment angles.

9 Claims, 38 Drawing Sheets

(51) Int. Cl.
 *B25J 9/00* (2006.01)
 *B25J 13/08* (2006.01)
(52) U.S. Cl.
 CPC .............. *A61H 2201/1626* (2013.01); *A61H 2201/1642* (2013.01); *A61H 2201/165* (2013.01); *A61H 2201/1671* (2013.01); *A61H 2201/5061* (2013.01); *A61H 2201/5084* (2013.01)
(58) Field of Classification Search
 CPC ...... A61H 2201/1626; A61H 2201/165; A61H 2201/5084; A61H 2201/1642; A61H 2201/1671; A61H 2201/50; A61H 2201/5069; B25J 9/006; B25J 9/0006; B25J 13/088; G01L 25/003; G01L 3/1407; G01L 3/106; G01L 3/108
 See application file for complete search history.

(56) References Cited

U.S. PATENT DOCUMENTS

| | | | | |
|---|---|---|---|---|
| 9,513,176 | B1* | 12/2016 | Weber | G01L 3/1457 |
| 2004/0249319 | A1* | 12/2004 | Dariush | A61H 3/00 |
| | | | | 600/595 |
| 2006/0046910 | A1* | 3/2006 | Rastegar | A63B 23/04 |
| | | | | 482/148 |
| 2006/0064047 | A1* | 3/2006 | Shimada | A61F 5/0102 |
| | | | | 602/26 |
| 2008/0188907 | A1* | 8/2008 | Aguirre-Ollinger | A61H 3/00 |
| | | | | 601/5 |
| 2008/0255488 | A1* | 10/2008 | Agrawal | A63B 69/0064 |
| | | | | 623/24 |
| 2009/0292369 | A1* | 11/2009 | Kazerooni | A61H 3/00 |
| | | | | 128/845 |
| 2010/0234775 | A1* | 9/2010 | Yasuhara | A61H 3/00 |
| | | | | 601/33 |
| 2011/0264263 | A1* | 10/2011 | Kamioka | B25J 9/1602 |
| | | | | 901/1 |
| 2013/0289452 | A1 | 10/2013 | Smith et al. | |
| 2014/0100491 | A1* | 4/2014 | Hu | A61H 3/008 |
| | | | | 601/23 |
| 2014/0330431 | A1* | 11/2014 | Hollander | A61H 3/00 |
| | | | | 29/428 |
| 2014/0358053 | A1* | 12/2014 | Triolo | B25J 9/0006 |
| | | | | 602/19 |
| 2015/0134079 | A1* | 5/2015 | Yoon | A61H 3/00 |
| | | | | 901/1 |
| 2015/0134080 | A1* | 5/2015 | Roh | B25J 9/1694 |
| | | | | 623/32 |
| 2015/0190923 | A1* | 7/2015 | Seo | A61H 1/0244 |
| | | | | 602/16 |
| 2015/0297934 | A1* | 10/2015 | Agrawal | A61H 1/0266 |
| | | | | 482/4 |
| 2016/0016309 | A1* | 1/2016 | Swift | B25J 9/0069 |
| | | | | 623/24 |
| 2016/0045385 | A1* | 2/2016 | Aguirre-Ollinger | |
| | | | | A61H 1/0244 |
| | | | | 623/24 |
| 2017/0043476 | A1* | 2/2017 | Seo | G05B 19/042 |
| 2017/0128235 | A1* | 5/2017 | Seo | A61F 5/0102 |
| 2017/0156895 | A1* | 6/2017 | Song | A61B 5/224 |
| 2017/0202724 | A1* | 7/2017 | De Rossi | A61H 3/00 |
| 2017/0340506 | A1* | 11/2017 | Zhang | A61H 3/00 |
| 2018/0071910 | A1* | 3/2018 | Seo | G05B 19/042 |
| 2018/0085280 | A1* | 3/2018 | Shimada | A61H 1/024 |
| 2018/0092792 | A1* | 4/2018 | Ohta | B25J 9/1633 |
| 2018/0116828 | A1* | 5/2018 | Quinn | B25J 9/0006 |
| 2018/0116895 | A1* | 5/2018 | Ikeuchi | G05B 15/02 |
| 2018/0125692 | A1* | 5/2018 | Takenaka | A61F 5/0102 |
| 2018/0125738 | A1* | 5/2018 | Witte | A61B 5/1038 |
| 2018/0177667 | A1* | 6/2018 | Uemura | A61B 5/112 |

OTHER PUBLICATIONS

Shiqian Wang et al. (Design and Control of the Mindwalker Exoskeleton. IEEE Transactions on Neural Systems and Rehabilitation Engineering vol. 23, No. 2, pp. 277-286, Mar. 2015) (Year: 2015).*
Abdoli-E et al., "An on-body personal lift augmentation device (PLAD) reduces EMG amplitude of erector spinae during lifting tasks," Clinical Biomechanics, 2006, 21(5):456-465.
Abdoli-E et al., "The effect of on-body lift assistive device on the lumbar 3D dynamic moments and EMG during asymmetric freestyle lifting", Clinical Biomechanics, 2008, 23, pp. 372-380.
Aguirre-Ollinger et al., "Design of an active one-degree-of-freedom lower-limb exoskeleton with inertia compensation," The International Journal of Robotics Research, 2011, 30(4):486-499.
Albu-Schäffer et al., "A unified passivity-based control framework for position, torque and impedance control of flexible joint robots," The International Journal of Robotics Research, 2007, 26(1):23-39.
Ansari et al., "A Survey of Current Exoskeletons and their Control Architectures and Algorithms Carnegie," Mellon University, Oct. 1, 2015, pp. 1-42.
ARGO Medical Technology Ltd., <http://rewalk.com/rewalk-personal-3/> (2016).
Armstrong-Helouvry, "Stick slip and control in low-speed motion," IEEE Traans. Autom. Control, 1993, 38(10):1483-1496.
Asbeck et al., "Soft Exosuit for Hip Assistance," Robotics and Autonomous Systems, 2015, vol. 73, pp. 102-110.
Bolton, "This breath-powered muscle suit takes the edge off of heavy lifting," <https://www.cnet.com/news/taking-the-edge-off-of-heavy-lifting-with-a-breath-powered-exo-suit/> (2017).
Bortole et al., "The H2 robotic exoskeleton for gait rehabilitation after stroke: early findings from a clinical study", Journal of NeuroEngineering and Rehabilitation, 2015, 12(54):1-14.
Calanca et al., "Robust Force Control of Series Elastic Actuators," Actuators 2014, 3, 182-204.
Crea et al., "A novel shoulder-elbow exoskeleton with series elastic actuators," 2016 6th IEEE International Conference on Biomedical Robotics and Biomechatronics (BioRob), Singapore, 2016, pp. 1248-1253.
Cyberdyne, <https://www.cyberdyne.jp/english/products/Lumbar_LaborSupport.html> (2017).
De Looze et al., "Exoskeletons for industrial application and their potential effects on physical work load," Ergonomics, 2016, 5(59):671-681.
Ding et al., "Effect of timing of hip extension assistance during loaded walking with a soft exosuit," Journal of NeuroEngineering and Rehabilitation, 2016, 2016(13):87.
Ding et al., "IMU-based Iterative Control for Hip Extension Assistance with a Soft Exosuit," in IEEE International Conference on Robotics and Automation (ICRA), Stockholm, Sweden, 2016, pp. 3501-3508.
Do Nascimento et al., "Hip Orthosis Powered by Pneumatic Artificial Muscle: Voluntary Activation in Absence of Myoelectrical Signal," Artif Organs, 2008, vol. 32, pp. 317-322.
Doke et al., "Mechanics and energetics of swinging the human leg," Journal of Experimental Biology, 2005, 208, 439-445.
Dollar et al., "Lower Extremity Exoskeletons and Active Orthoses: Challenges and State of the Art," IEEE Transactions on Robotics, 2008, 24(1): 144-158.
Ekso Bionics, <http://eksobionics.com/> (2016).
Emken et al., "Robotic movement training as an optimization problem: designing a controller that assists only as needed," in Proceedings of the IEEE International Conference on Rehabilitation Robotics (ICORR), 2005, p. 307-312.

(56) References Cited

OTHER PUBLICATIONS

Esquenazi et al., "The ReWalk powered exoskeleton to restore ambulatory function to individuals with thoracic-level motor-complete spinal cord injury," Am. J. Phys. Med. Rehabil., 2012, 91(11):911-921.
Frost et al., "PLAD (personal lift assistive device) stiffness affects the lumbar flexion/extension moment and the posterior chain EMG during symmetrical lifting tasks," Journal of Electromyography and Kinesiology, 2009, 19, pp. e403-e412.
Giovacchini et al., "A Light-weight Active Orthosis for Hip Movement Assistance", Robotics and Autonomous Systems, 2015, vol. 73, pp. 123-134.
Hayes et al., "Passive visco-elastic properties of the structures spanning the human elbow joint," European Journal Applied Physiology, 1977, 37, 265-274.
Hof et al., "Responses of human hip abductor muscles to lateral balance perturbations during walking," Experimental Brain Research, 2013, 230(3):301-310.
Hof et al., "The condition for dynamic stability," J. Biomech., 2005, 38(1):1-8.
Hof, "The 'extrapolated center of mass' concept suggests a simple control of balance in walking," Human Movement Sci., 2008, 27(1):112-125.
Hussain et al., "Adaptive Impedance Control of a Robotic Orthosis for Gait Rehabilitation," IEEE Transactions on Cybernetics, 2013, 43(3):1025-1034.
Kashiri et al., "On the Sensor Design of Torque Controlled Actuators: A Comparison Study of Strain Gauge and Encoder-Based Principles," in IEEE Robotics and Automation Letters, 2017, 2(2):1186-1194.
Keller et al., "ChARMin: The First Actuated Exoskeleton Robot for Pediatric Arm Rehabilitation," IEEE/ASME Transactions on Mechatronics, 2016, 21(5):2201-2213.
Kim et al., "Force-Mode Control of Rotary Series Elastic Actuators in a Lower Extremity Exoskeleton Using Model-Inverse Time Delay Control," IEEE/ASME Transactions on Mechatronics, 2017, 22(3):1392-1400.
Kim et al., "Estimation of lumbar spinal loading and trunk muscle forces during asymmetric lifting tasks: application of whole-body musculoskeletal modelling in OpenSim," Ergonomics, 2017, 4(60):563-576.
Kong et al., "Control of Rotary Series Elastic Actuator for Ideal Force-Mode Actuation in Human-Robot Interaction Applications," IEEE/ASME Transactions on Mechatronics, 2009, 14(1):105-118.
Kong et al., "A compact rotary series elastic actuator for human assistive systems," IEEE/ASME Trans. Mechatronics, 2012, 17(2):288-297.
Krebs et al., "Rehabilitation Robotics: Performance-Based Progressive Robot-Assisted Therapy," Autonomous Robots, 2003, vol. 15, pp. 7-20.
Kuo, "Stabilization of lateral motion in passive dynamic walking," International Journal of Humanoid Robotics, 1999, 18(9):917-930.
Lee et al., "Biomechanical Design of a Novel Flexible Exoskeleton for Lower Extremities," in IEEE/ASME Transactions on Mechatronics, 2017, 22(5):2058-2069.
Lewis et al., "Invariant Hip Moment Pattern While Walking with a Robotic Hip Exoskeleton", Journal of Biomechanics, 2011, vol. 44, pp. 789-793.
Li et al., "Adaptive Human-Robot Interaction Control for Robots Driven by Series Elastic Actuators," IEEE Transactions on Robotics, 2017, 33(1):169-182.
Li et al., "Novel Functional Task-Based Gait Assistance Control of Lower Extremity Assistive Device for Level Walking," IEEE Trasactions on Industrial Electronics, 2016, 63(2):1096-1106.
Li et al., "Design and Control of Robotic Exoskeleton with Balance Stabilizer Mechanism," 2015 IEEE/RSJ International Conference on Intelligent Robots and Systems (IROS) Congress Center Hamburg, Sep. 28-Oct. 2, Hamburg, Germany, 2015, pp. 3817-3823.
Li et al., "Multi-modal control scheme for rehabilitation robotic exoskeletons," International Journal of Robotics Research, 2017, 36(5-7):759-777.
Losey et al., "A Time-Domain Approach to Control of Series Elastic Actuators: Adaptive Torque and Passivity-Based Impedance Control," IEEE/ASME Transactions on Mechatronics, 2016, 21(4):2085-2096.
Luo et al., "Wearable stooping-assist device in reducing risk of low back disorders during stooped work," in 2013 IEEE Int. Conf. on Mechatronics and Automation. IEEE, 2013, pp. 230-236.
MacKinnon et al., "Control of whole body balance in the frontal plane during human walking," Journal of Biomechanics, 1993, 26(6):633-644.
Martelli et al., "The effects on biomechanics of walking and balance recovery in a novel pelvis exoskeleton during zero-torque control," Robotica, 2014, 32(8):1317-1330.
Mathijssen et al., "Variable recruitment of parallel elastic elements: Series-parallel elastic actuators (SPEA) with dephased mutilated gears", IEEE/ASME Transactions on Mechatronics, 2015, 20(2):594-602.
Mazumdar et al., "Parallel Elastic Elements Improve Energy Efficiency on the STEPPR Bipedal Walking Robot", IEEE/ASME Transactions on Mechatronics, 2016, 22(2):898-908.
McIlroy et al., "Do anticipatory postural adjustments precede compensatory stepping reactions evoked by perturbation?" Neuroscience letters, 1993, 164(1):199-202.
Mindwalker exoskeleton. <https://www.utwente.nl/ctw/bw/research/projects/MINDWALKER/> (2016).
Monaco et al, "An ecologically-controlled exoskeleton can improve balance recovery after slippage," Scientific Reports, 2017, 7:46721.
Murray et al., "An Assistive Control Approach for a Lower-Limb Exoskeleton to Facilitate Recovery of Walking Following Stroke," IEEE Transactions on Neural Systems and Rehabilitation Engineering, 2015, 23(3):441-449.
Nagarajan et al., "Integral admittance shaping: A unified framework for active exoskeleton control," Robotics and Autonomous, 2016, 75, 310-324.
Naruse et al., "Development of wearable exoskeleton power assist system for lower back support," Proceedings 2003 IEEE/RSJ International Conference on Intelligent Robots and Systems (IROS 2003) (Cat. No. 03CH37453), 2003, vol. 3, pp. 3630-3635.
Oh et al., "High-Precision Robust Force Control of a Series Elastic Actuator," IEEE/ASME Transactions on Mechatronics, 2017, 22(1):71-80.
Peternel et al., "Adaptive Control of Exoskeleton Robots for Periodic Assistive Behaviours Based on EMG Feedback Minimisation," PLoS One, 2016, 11(2):e0148942.
Pomet et al., "Adaptive nonlinear regulation: estimation from the Lyapunov equation," IEEE Transactions on Automatic Control, 1992, 37(6):729-740.
Pratt et al., "Capture point: A step toward humanoid push recovery," Humanoid Robots, 2006 6th IEEE-RAS, 2006, pp. 200-207.
Pratt et al., "Series Elastic Actuators," in Proc. Of the 1995 IEEE/RSJ Conference on Intelligent Robots and Systems (IROS), Pittsburgh, USA, 1995, pp. 399-406.
Quinlivan et al., "Assistance magnitude versus metabolic cost reductions for a tethered multiarticular soft exosuit," Science Robotics, 2017, 2(2):eaah4416.
Raj et al., "Mina: A Sensorimotor Robotic Orthosis for Mobility Assistance," Journal of Robotics, 2011, vol. 2011, Article ID 284352, 8 pages.
Ruderman et al., "Compensation of Nonlinear Torsion in Flexible Joint Robots: Comparison of Two Approaches," IEEE Trans. Ind. Electron, 2016, 63(9):5744-5751.
Sariyildiz et al., "An Acceleration-Based Robust Motion Controller Design for a Novel Series Elastic Actuator," IEEE Transactions on Industrial Electronics 63, 2016, No. 3, 1900-1910.
Solazzi et al.,"An Interaction Torque Control Improving Human Force Estimation of the Rehab-Exos Exoskeleton," IEEE Haptics Symposium, 2014, pp. 23-26.
Spong et al., "Adaptive control of flexible joint Manipulators," Systems & Control Letters, 1989, 13: 15-21.

(56) References Cited

OTHER PUBLICATIONS

Strausser et al., "The development and testing of a human machine interface for a mobile medical exoskeleton," 2011 IEEE/RSJ International Conference on Intelligent Robots and Systems, IEEE, 2011, pp. 4911-4916.

Strongarm Technologies, "Strongarm Ergoskeleton, Lift Assit Device, V22," <https://cdn.shopify.com/s/files/1/0059/3932/files/StrongArm_V22_Sell_Sheet-LR.pdf?13971292558002228332> (2017).

Sugar et al., "HeSA, Hip Exoskeleton for Superior Assistance," Wearable Robotics: Challenges and Trends, 2017, vol. 16, pp. 319-323.

SUITX, "Phoenix Medical Exoskeleton," Available: <http://www.suitx.com/phoenix> (2003).

Tanabe et al., "Wearable Power-Assist Locomotor (WPAL) for supporting upright walking in persons with paraplegia," NeuroRehabilitation, 2013, 33(1):99-106.

Ugurlu et al., "Variable Ankle Stiffness Improves Balance Control: Experiments on a Bipedal Exoskeleton," IEEE/ASME Transactions on Mechatronics, 2016, 21(1):79-87.

Vitiello et al., "Functional Design of a Powered Elbow Orthosis Toward its Clinical Employment", IEEE/ASME Transactions on Mechatronics, 2016, 21(4):1880-1891.

Wang et al., "Actively Controlled Lateral Gait Assistance in a Lower Limb Exoskeleton," 2013 IEEE/RSJ International Conference on Intelligent Robots and Systems (IROS) Nov. 3-7, 2013. Tokyo, Japan, 965-970.

Wang et al., "Design and Control of the Mindwalker Exoskeleton," IEEE Transactions on Neural Systems and Rehabilitation Engineering, 2015, 23(2):277-286.

Winter, Biomechanics and Motor Control of Human Movement, 4th Edition, 2009, p. 86.

Woo et al., "Design of a compact rotary series elastic actuator for improved actuation transparency and mechanical safety," 2017 IEEE International Conference on Robotics and Automation (ICRA), Singapore, 2017, pp. 1872-1877.

Wu et al., "Design and Control of a Powered Hip Exoskeleton for Walking Assistance," International Journal of Advanced Robotic Systems, 2015, 12(3):1-11.

Yan et al., "Review of Assistive Strategies in Powered Lower-Limb Orthoses and Exoskeletons," Journal Robotics and Autonomous Systems, 2015, 64(C):120-136.

Yasuhara et al., "Walking Assist Device with Stride Management System," Honda R&D Technical Review, 2009, 21(2):57-66.

Young et al., "State of the art and Future Directions for Lower Limb Robotic Exoskeletons," IEEE Transactions on Neural Systems and Rehabilitation Engineering, 2016, 25(2):171-182.

Yu et al., "Human-Robot Interaction Control of Rehabilitation Robots with Series Elastic Actuators," IEEE Transactions on Robotics, 2015, vol. 31, pp. 1089-1100.

Zhang et al., "Admittance Shaping-based Assistive Control of SEA-driven Robotic Hip Exoskeleton", IEEE/ASME Transactions on Mechatronics, Aug. 2019, 24(4): 1508-1519.

Zhang et al., "NREL-Exo: a 4-DoFs wearable hip exoskeleton for walking and balance assistance in locomotion," in IEEE/RSJ International Conference on Intelligent Robots and Systems (IROS), Vancouver, BC, Canada, Sep. 24-28, 2017.

International Search Report and Written Opinion for Application No. PCT/US2018/052316 dated Nov. 30, 2018 (15 pages).

* cited by examiner

Table II Impedance Parameters

| Gait Phase | | Stiffness (Nm/Deg) | | Damping (Nm/Deg·s−1) | | Equilibrium Angle (Deg) | |
|---|---|---|---|---|---|---|---|
| | | HFE | HAA | HFE | HAA | HFE | HAA |
| Set I/III | ES | 0.06 | 0.02 | 0.06 | 0.02 | 40 | 0 |
| | LS | 0.06 | 0.02 | 0.06 | 0.02 | 0 | 0 |
| | stance | 0.02 | 0.02 | 0.02 | 0.02 | −10 | 0 |
| Set II | ES | 0.06 | 0.02 | 0.06 | 0.02 | MHFA | CO |
| | LS | 0.06 | 0.02 | 0.06 | 0.02 | 0 | CO |
| | stance | 0.02 | 0.02 | 0.02 | 0.02 | MHEA | CO |

FIG. 21

Table III Summarizes the results of experiment II

| S | # | PD | PA (N) | GP | DT | HAA (L/R deg) | SW (mm) | WS (deg) |
|---|---|---|---|---|---|---|---|---|
| 2 | p1 | PI | 17.5 | 5 | 0.1 | -9/9 | 300 | 7.5 |
| | p2 | PI | 18 | 5 | 0.05 | 4.5/-4.5 | 300 | 6 |
| | p3 | PI | 16.5 | 5 | 0.04 | -3/3 | 300 | 5.6 |
| | p4 | PI | 20 | 4 | 0.04 | -3/3 | 310 | 6.6 |
| | p5 | PIII | 15 | 5 | 0.01 | 3/3 | 350 | 4 |
| | p6 | PIII | 24.5 | 4 | 0.02 | 6/6 | 440 | 3.6 |
| | p7 | PI | 20 | 5 | 0.06 | -6/6 | 290 | 7.2 |
| | p8 | PII | 5 | 3 | 0.025 | 6/7 | 438 | -3.1 |
| 3 | p1 | PII | - | 5 | 0.04 | 10/10 | 480 | 5 |
| | p2 | PII | - | 5 | 0.035 | 9/9 | 440 | 4.8 |
| | p3 | PII | - | 5 | 002 | 7/7 | 300 | 4.7 |
| | p4 | PI | 20 | 5 | 0.05 | -4/4 | 170 | 12 |
| | p5 | PII | - | 3 | 0.01 | 5/4 | 310 | -4.6 |
| | p6 | PII | - | 5 | 0.02 | 6/9 | 405 | 4.8 |
| | p7 | PII | - | 5 | 0.025 | 7/7 | 400 | 4.8 |
| | p8 | PII | - | 5 | 0.03 | 8/8 | 406 | 4.9 |
| | P9 | PII | - | 5 | 0.02 | 2/6 | 290 | 4.2 |
| | p10 | PII | 18 | 2 | 0.04 | 6/6 | 320 | -4.4 |
| | p11 | PII | - | 5 | 0.03 | 8/8 | 380 | 4.8 |
| | p12 | PI | 25 | 4 | 0.2 | -15/15 | 240 | 16 |

S-subject, PD-perturbation direction, PA- perturbation amplitude, P-gait phase, DT- peak deviation from threshold, SW- peak step width, WS- peak weight shift, L-left, R-right, PI- perturbation were applied on the swing leg side during the right leg single support gait phase (gait phase 2 or 3), PII- perturbation were applied on the support leg side during left leg single support gait phase (gait phase 4 or 5), PIII- perturbation were applied on the support leg side during right leg single support gait phase (gait phase 2 or 3)

FIG. 24

| States | Joints | Clutch | Equilibrium angle | Stiffness | Damping |
|---|---|---|---|---|---|
| No loading | HFE | Off | - | - | - |
|  | HAA | Off | - | - | - |
| Lifting | HFE | On | 0 | 0.5 | 0.4 |
|  | HAA | On | 0 | 0.5 | 0.4 |
| Lowering | HFE | On | 0 | 0.5 | 0.4 |
|  | HAA | On | 0 | 0.5 | 0.4 |

HIP EXOSKELETON

CROSS-REFERENCE TO RELATED APPLICATIONS

This patent application is the U.S. national stage entry, under 35 U.S.C. § 371, of International Application Number PCT/US2018/052316, filed Sep. 22, 2018, which is a non-provisional of and claims the benefit of U.S. Provisional Application No. 62/562,227, filed Sep. 22, 2017, the entire contents of each of which are hereby incorporated by reference.

BACKGROUND OF THE INVENTION

Individuals with neurological disorders suffer from decreased muscle activity and consequently insufficient hip torque during locomotion. This also often leads to decreased self-balancing capacities, which leaves these individuals vulnerable to unexpected falls. These setbacks can be mitigated with lower limb exoskeletons. Future exoskeletons are expected to help patients with physical disabilities effectively restore their normal walking ability and improve their quality of life.

Further, in the biomechanics of human locomotion, the control of foot placement in both the mediolateral and anteroposterior directions has long been recognized as an effective mechanism for maintaining bipedal gait stability. During walking, beyond the forward step length regulated by hip flexion/extension (HFE), adaptation of the step width, which can be adjusted by hip abduction/adduction (HAA) motions, is also crucial for walking stability. A lateral weight shift and HAA motions have been shown to precede the initiation of a forward step. Biomechanical studies have indicated that the step width and the mediolateral foot placement at the end of each step can be estimated based on the center of mass (CoM), which is assumed to be located at the pelvis. The extrapolated center of mass (XCoM) is obtained by vertically projecting the CoM's position to the ground in the direction of its velocity. More specifically, the XCoM combines information about the current kinematics data of the CoM to predict a future time at which the CoM will contact the support boundary. Because the XCoM has been validated in both static and dynamic situations, it can be used as a flexible spatial variable in the formulation of conditions for stability during walking. In the presence of perturbations and other dynamic postural conditions, the XCoM is an important parameter in determining whether an additional step is required to maintain balance.

Several solutions for addressing wearer-exoskeleton stability in locomotion have recently been proposed. For example, an additional balance stabilizer mechanism is known that can be attached to the wearer to enhance the stability of the wearer-exoskeleton system. However, the additional stabilizer is large in size and weight, which may further limit the mobility of the wearer. Compliant actuation has also been used in full-body exoskeletons to produce relatively stable and natural gaits, but the size and complexity of such exoskeletons significantly limits their mobility. Moreover, since hip and ankle joints are critical for balance and upright stability in humans, several studies have attempted to advance hip and/or ankle design and control to address wearer-exoskeleton stability. Unfortunately, the lower-limb exoskeleton used in experiments that exploited variable ankle stiffness was effectively a bipedal robot that did not include the human wearer in the loop. Finally, hip torque in the frontal plane was used to counteract the momentum arising from gait perturbations such as trips and slips. In particular, an exoskeleton was developed with active HAA to adapt step width and counteract gait disturbances in the frontal plane based on the XCoM concept. However, this work focused on spinal cord injury (SCI) paraplegics, and thus the controller was formulated to track a predefined gait trajectory. This method is appropriate and effective for paraplegics but will present problems to wearers who still have voluntary motor control because the forced motion applied to the human joints may conflict with users' effort. Furthermore, only perturbations from the stance side during single-support were considered, whereas disturbances could also come from the swing side during locomotion.

An important feature of hip and lower-limb exoskeletons balance control, which separates them from biped robots, is the participation of wearers in locomotion, balance control, and decision making process. The exoskeleton should not override wearers' behaviors to provide assistance but rather encourage their participation and avoid slacking. If the wearer has muscular weakness but still retains voluntary motor control of their lower limbs for balance recovery, inappropriately applied exoskeleton's assistive torque applied to the human joints may conflict with the natural way of walking, thus causing an increase in the effort needed for walking or even will causing fall. How much mechanical assistance is appropriate for balance recovery is still an open question for wearable robot control in general. Research has shown that wearers with voluntary muscle control will inadvertently modulate their own muscle torques when the human-exoskeleton coupled system is losing balance under perturbation. Moreover, muscle efforts required to maintain balance vary among users, and even in the same user under different circumstances. An ideal exoskeleton controller for balance assistance should therefore continuously adapt to the wearer's intentions and movements to (1) provide appropriate assistance upon disturbances or at the wearer's request and (2) present high levels of transparency under no-assistance conditions.

Another use for exoskeletons is to promote back support in industrial workers who are required to manually handle heavy materials to reduce spinal loads during these tasks and thereby reduce the risk of work-related back injuries. Biomechanical studies show that the lumbar spine compression is a key risk factor of the musculoskeletal injuries. Manual handling material includes lifting, lowering and carrying and is the most common work in industrial environments. Lifting and lowering tasks can significantly load the lumbar spine and carry a high risk of lower back injury. Work-related injuries not only increase industrial costs but, more importantly, also have a severe impact on the worker's quality of life. There has been increasing interest in researching the use of wearable powered exoskeleton to reduce the risk of resulting musculoskeletal injuries.

Commercial exoskeletons for back support usually have powered hip joints in the sagittal plane. One limitation of the current back-support exoskeletons is that they do not provide back support at the frontal planes. A biomechanical study showed that the gluteal muscles that support hip abduction/adduction are activated during lifting tasks to avoid twisting motions and support balance during lifting. Furthermore, asymmetric lifting and lowering are considered important factors in the incidence of lower back pain and, in particular, are a reason for prolapsed discs. A worker is usually trained using the squat technique to manually handle material in the workplace to reduce lumbar spinal loading. However, it has been documented that losing balance during lifting and lowering tasks is more likely to occur, which will eventually cause high lumbar loading. The lifting and lowering of heavy and irregularly shaped objects can easily lead to twisting or pulling a muscle or tendon. In the biomechanics of human workers, both sagittal and frontal plane back support will effectively reduce the lumbar spinal loading due to lifting while in a twisting posture or losing balance during squatting.

Recently, soft exoskeletons have garnered research interest because in contrast to traditional rigid exoskeletons with rigid support frames, they can be worn like clothing. Soft materials, such as textiles and elastomers, are used in the fabrication of soft exoskeletons, unlike traditional rigid exoskeletons with rigid support frames. However, to date, soft wearable exoskeletons have presented their own inherent limitations, such as an absence of weight-support functionality. Given the current state of robotic technology, the implementation of a robotic lower-limb exoskeleton that is capable of biological levels of joint torque and velocity will likely introduce non-negligible mass, rotational inertia, and possibly joint friction.

SUMMARY OF THE INVENTION

The present invention provides, in one aspect, a hip exoskeleton wearable on a body of a human having two legs, the hip exoskeleton comprising a first HAA joint and a second HAA joint to assist the human with leg abduction and adduction movements that are parallel to a frontal plane, each of the first and the second HAA joints having an actuator, each actuator including a motor and a clutch. The hip exoskeleton further comprises a sensor system for measuring a combined center of mass of the human and the exoskeleton in the frontal plane and a step width of the human in the frontal plane. The exoskeleton further comprises a controller that outputs adjustment angles for each of the first and the second HAA joints based on the center of mass and the step width. The first and the second HAA joints are respectively rotated based on the respective output adjustment angles.

The present invention provides, in another aspect, a method of operating an exoskeleton having a first HAA joint and a second HAA joint and wearable by a human with a first leg and a second leg, the exoskeleton configured to assist the human with abduction and adduction leg movements in a frontal plane, the first HAA joint associated with the first leg, the second HAA joint associated with the second leg. The method comprises measuring an acceleration, a velocity, and an orientation of the human in a frontal plane, calculating a combined center of mass of the human and the exoskeleton in the frontal plane, calculating a step width of the human in the frontal plane, outputting a first adjustment angle for the first HAA joint based on the center of mass and the step width, outputting a second adjustment angle for the second HAA joint based on the center of mass and the step width, rotating the first HAA joint based on the first adjustment angle, and rotating the second HAA joint based on the second adjustment angle.

The present invention provides, in yet another aspect, an exoskeleton wearable on a body of a human having two legs, the exoskeleton comprising an inertia measurement unit to measure a hip acceleration, a velocity and an orientation of the human in a sagittal plane and a frontal plane. The exoskeleton also comprises a first HAA joint and a second HAA joint to assist the human with leg abduction and adduction movements that are parallel to the frontal plane and a first HFE joint and a second HFE joint to assist the human with leg flexion and extension movements that are parallel to the sagittal plane, each of the first and the second HAA joints and the first and the second HFE joints having an actuator, each actuator including a motor and a clutch. The exoskeleton also comprises a controller for calculating a combined center of mass of the human and the exoskeleton in the frontal plane and a step width of the human in the frontal plane, the controller configured to output adjustment angles for each of the first and the second HAA, joints based on the center of mass and the step width. The first and the second HAA joints are respectively rotated based on the respective output adjustment angles.

Other aspects of the invention will become apparent by consideration of the detailed description and accompanying drawings.

BRIEF DESCRIPTION OF THE DRAWINGS

FIG. 21 is a table of impedance parameters for Experiment 1.

FIG. 24 is a table that summaries the results of Experiment 1-II.

Figure 1:
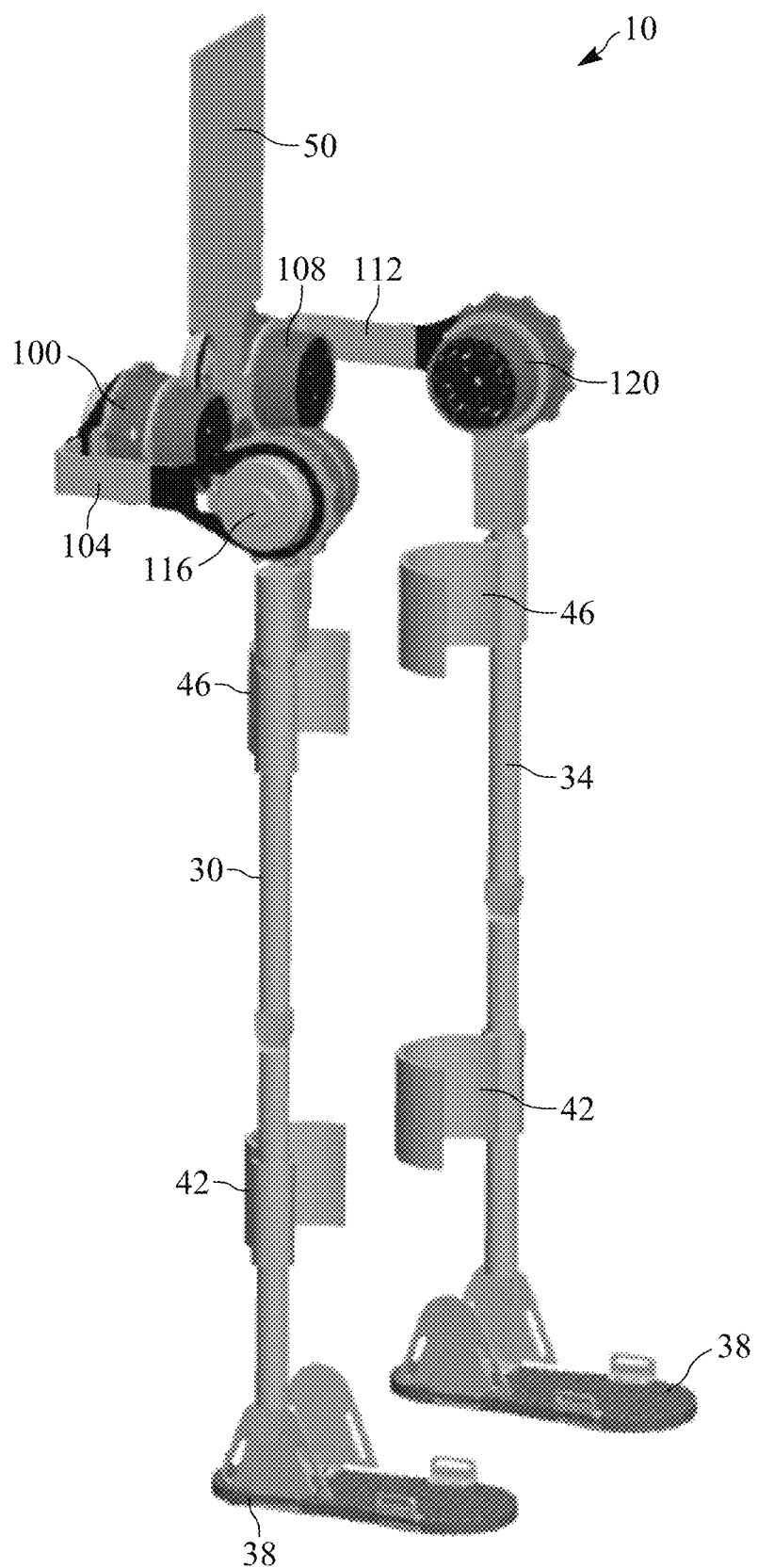
FIG. 1 is a perspective view of a hip exoskeleton according to an embodiment of the present invention.
Figure 2:
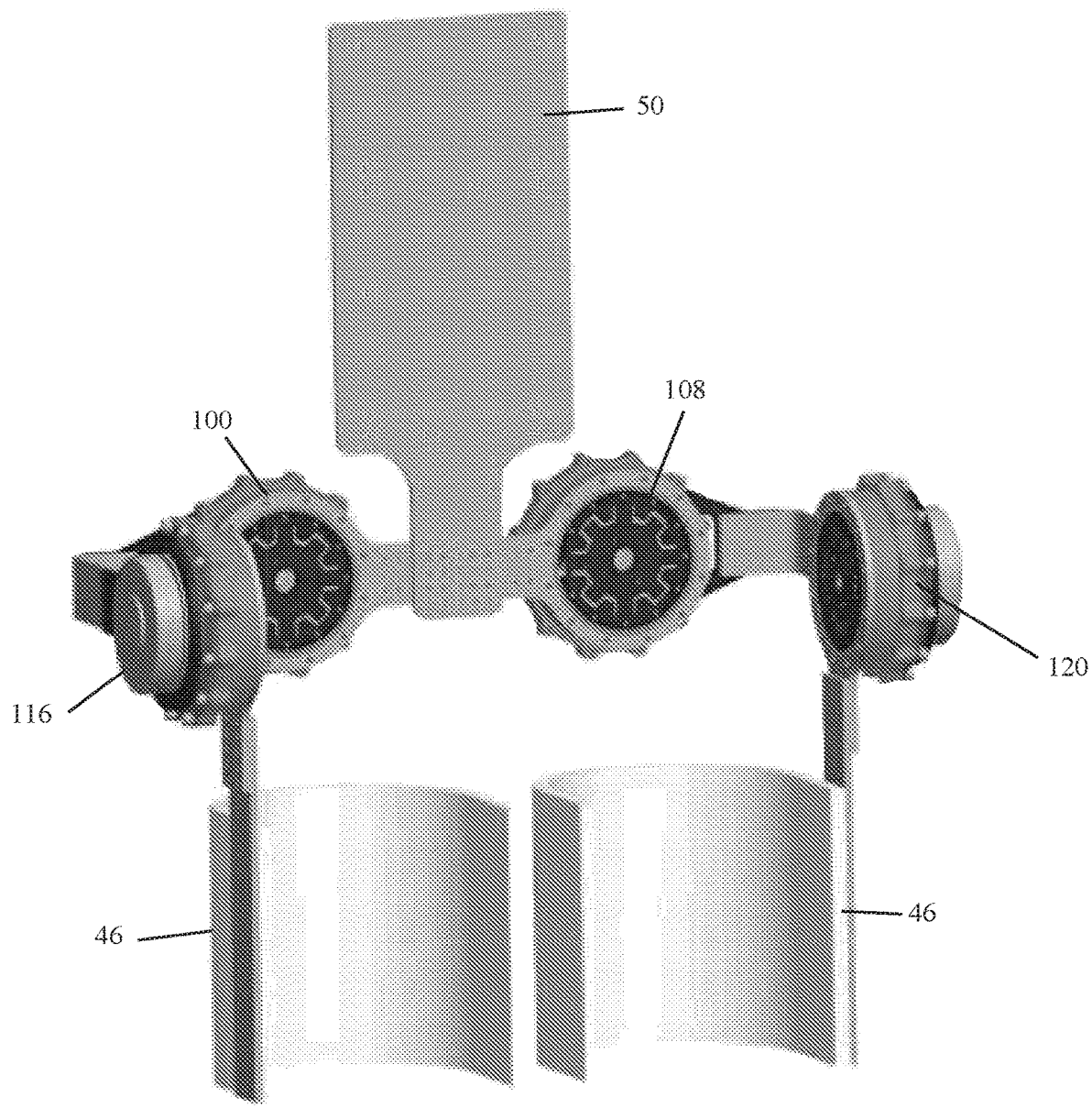
FIG. 2 is a front perspective view of a portion of the exoskeleton illustrated in FIG. 1.
Figure 3:
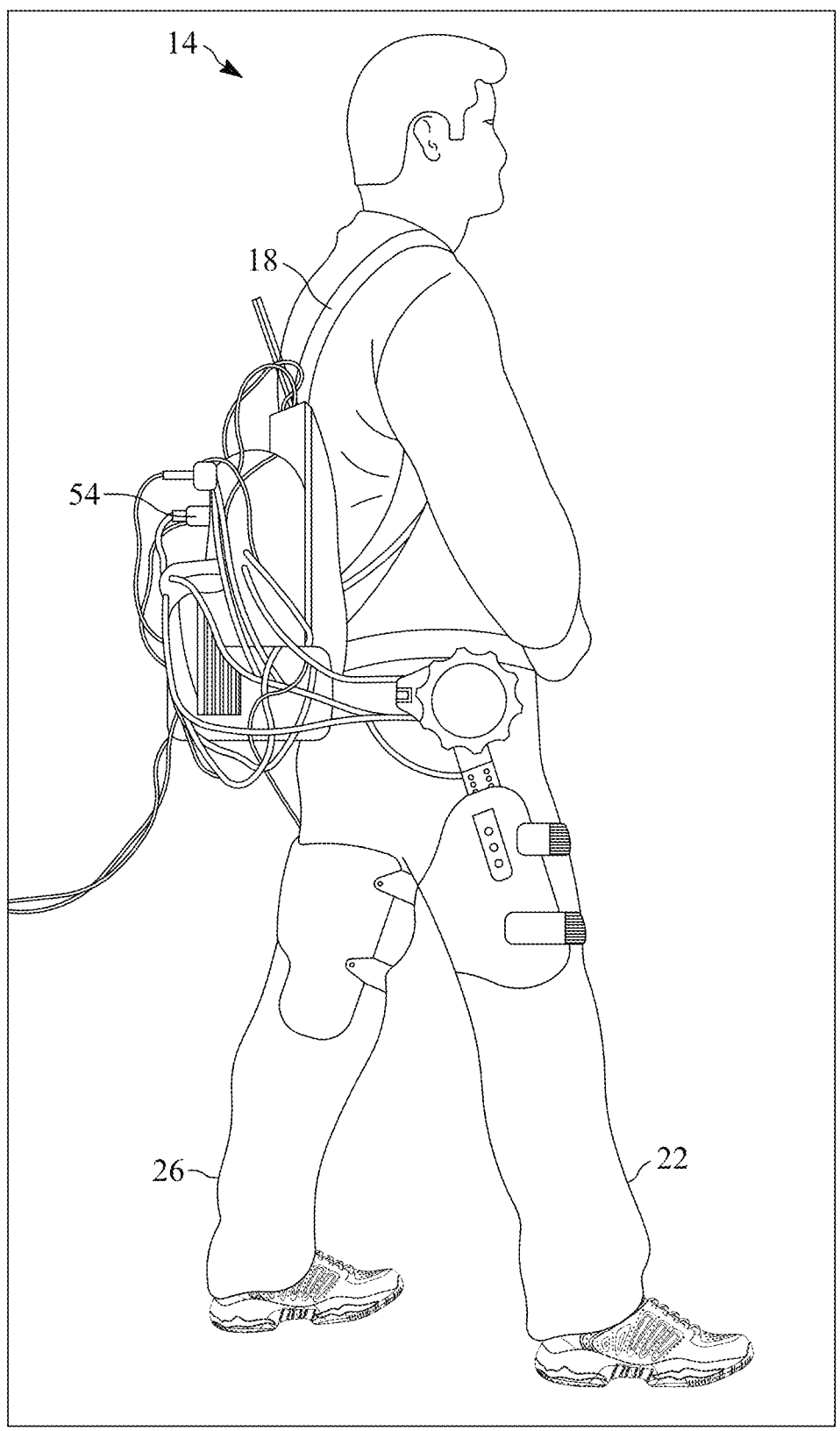
FIG. 3 is a side perspective of a portion of the exoskeleton of FIG. 1 worn by a human.
Figure 4:
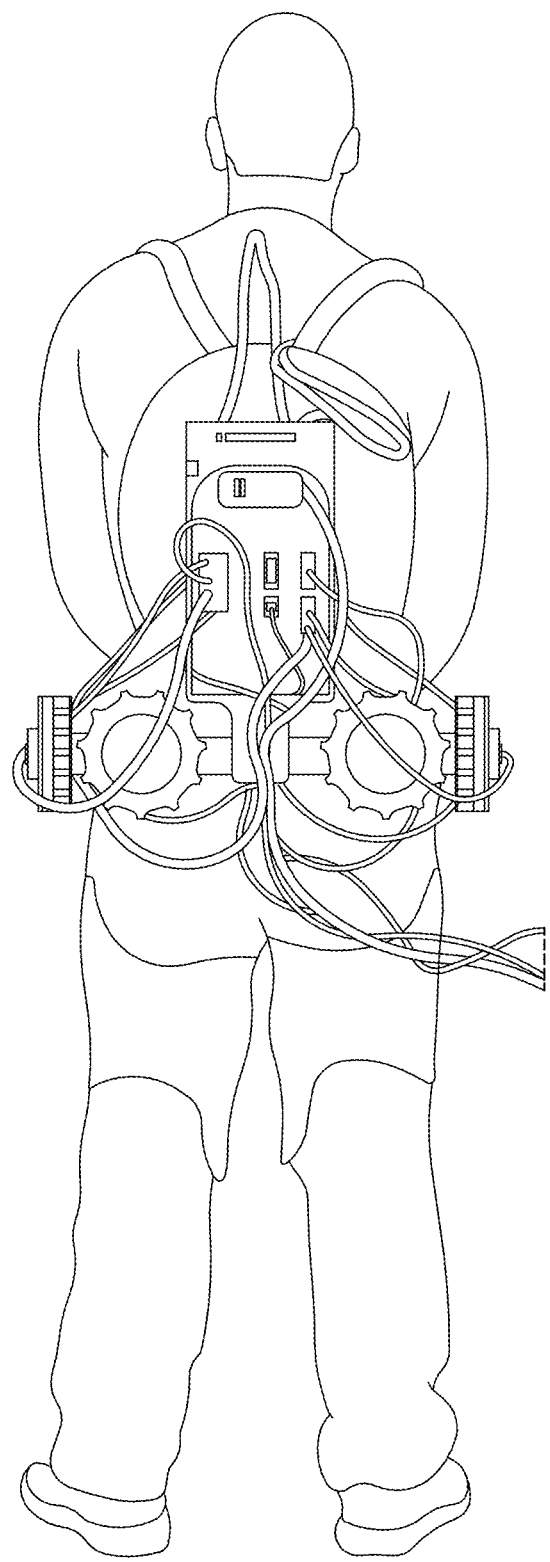
FIG. 4 is a rear perspective view of a portion of the exoskeleton of FIG. 1 worn by a human.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

One or more embodiments are described in the following description and illustrated in the accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory, computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

It should also be noted that a plurality of hardware and software based devices, as well as a plurality of different structural components may be utilized to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more electronic processors. As such, it should be noted that a plurality of hardware and software based devices, as well as a plurality of different structural components may be utilized to implement the invention. For example, "control units" and "controllers" described in the specification can include one or more electronic processors, one or more memory modules including non-transitory computer-readable medium, one or more input/output interfaces, and various connections (for example, a system bus) connecting the components.

While some embodiments may be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Figure 5:
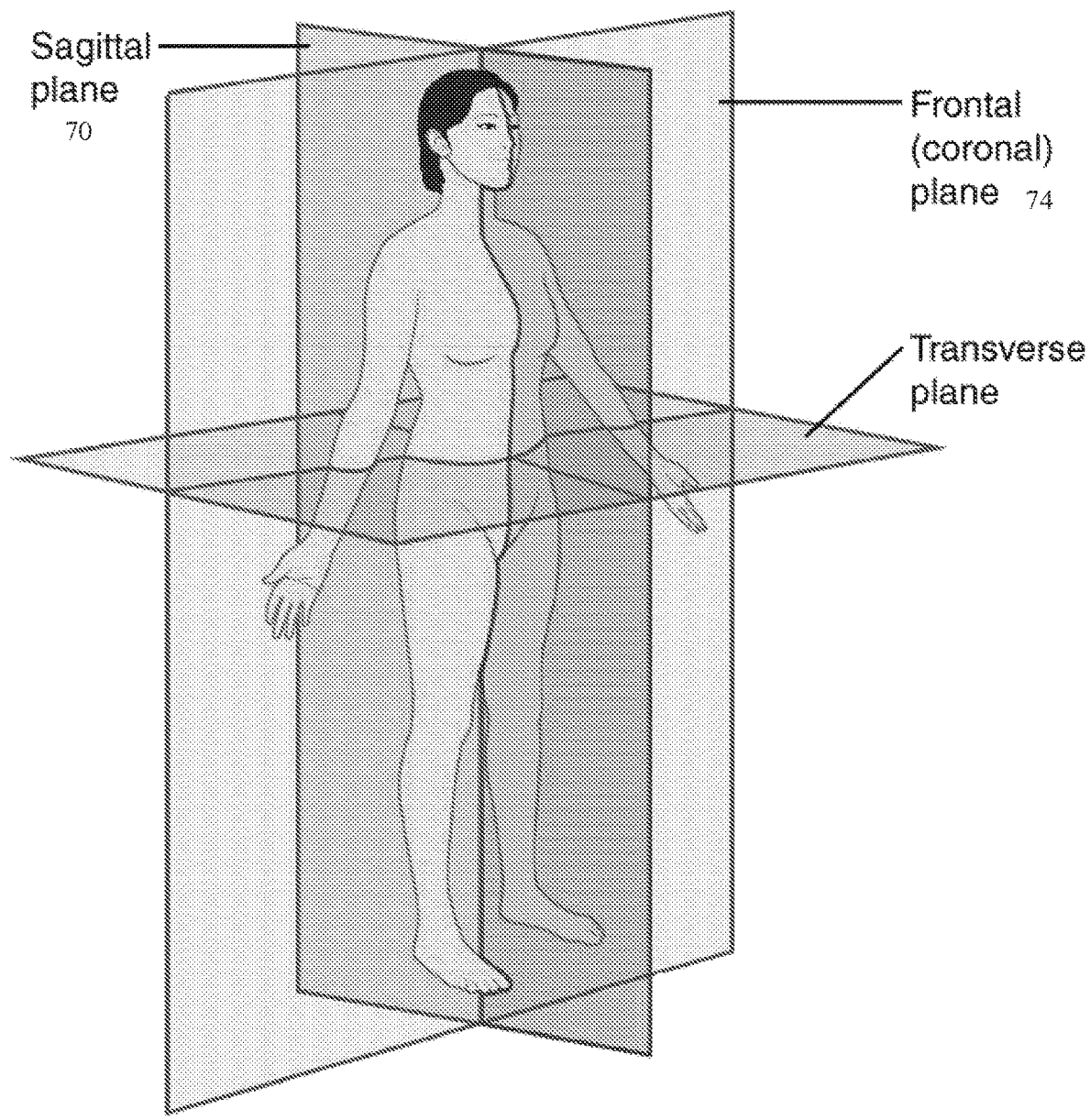
FIG. 5 is a schematic illustrating the anatomical planes relative to a human.

FIGS. 1-4 illustrate an exoskeleton 10 according to an embodiment of the present invention. The exoskeleton 10 is wearable by a human 14 having an upper body 18, a first leg 22, and a second leg 26. The exoskeleton 10 includes a first support leg 30 and a second support leg 34, which are respectively configured to support the first and second legs 22, 26 of the human 14. Each support leg 30, 34 has a foot pad 38, a calf cuff 42, and a thigh cuff 46. The exoskeleton 10 includes a back plate 50 which supports a torso module 54. Each of the first and second support legs 22, 26 have a sliding or telescoping mechanism (not shown) in the calf cuff 42 and thigh cuff 46 such that the exoskeleton 10 can be adjusted to fit different humans 14. Additionally, a sliding rail system (not shown) is included between the back plate 50 and each of the first and second leg supports 30, 34 to adjust the exoskeleton 10. The torso module 54 may include an inertia measurement unit 58 (IMU) to measure acceleration, a velocity, and an orientation of the human 14 or the upper body 18 of the human 14 in a sagittal plane 70 and frontal plane 74, as shown in FIG. 5. The IMU may be positioned at other location on the exoskeleton 10. In some embodiments, the torso module 54 can be a waist module that is worn on the waist.

Each foot pad 38 includes a resistive foot-pressure sensor array (not shown) that uses a plurality of switches to detect foot-ground contact and foot-off events, which are used to distinguish different phases of the human walking. The torso module 54 also includes a controller (not shown), such as a balance controller, which is able to calculate a combined center of mass of the human and the exoskeleton in the frontal plane 74 and a step width of the human in the frontal plane 74 based on acceleration, velocity, and orientation measurements of the inertia measurement unit and the measurements of the resistive foot-pressure sensor arrays in each foot pad 38. The step length of each support leg 30, 34 is also measured.

With reference to FIGS. 1-5, a first hip-abduction-and-adduction ("HAA") joint 100 is coupled to the back plate 50 and a first side support 104, and a second HAA joint 108 is coupled to the back plate 50 and a second side support 112. The HAA joints 100, 108, respectively, permit the first and second side supports 104, 112, to pivot about the first and second HAA joints 100, 108 in directions parallel to the back plate 50 and the frontal plane 74. The HAA joints 100, 108 assist the human 14 with abduction and adduction leg movements in directions parallel to the back plate 50 and the frontal plane 74 and perpendicular to the sagittal plane 70.

The exoskeleton 10 includes also includes a first hip-flexion-and-extension "HFE") joint 116 coupled between the first side support 104 and the first support leg 30 and a second HFE joint 120 coupled between the second side support 112 and the second support leg 34. The first and second HFE joints 116, 120, respectively, permit the first and second leg supports 30, 34 to pivot about the first and second HFE joints 116, 120 in directions parallel to the sagittal plane 70. The HFE joints 116, 120 assist the human 14 with flexion and extension leg movements in directions parallel to the sagittal plane 70 and perpendicular to the frontal plane 74.

Figure 6:
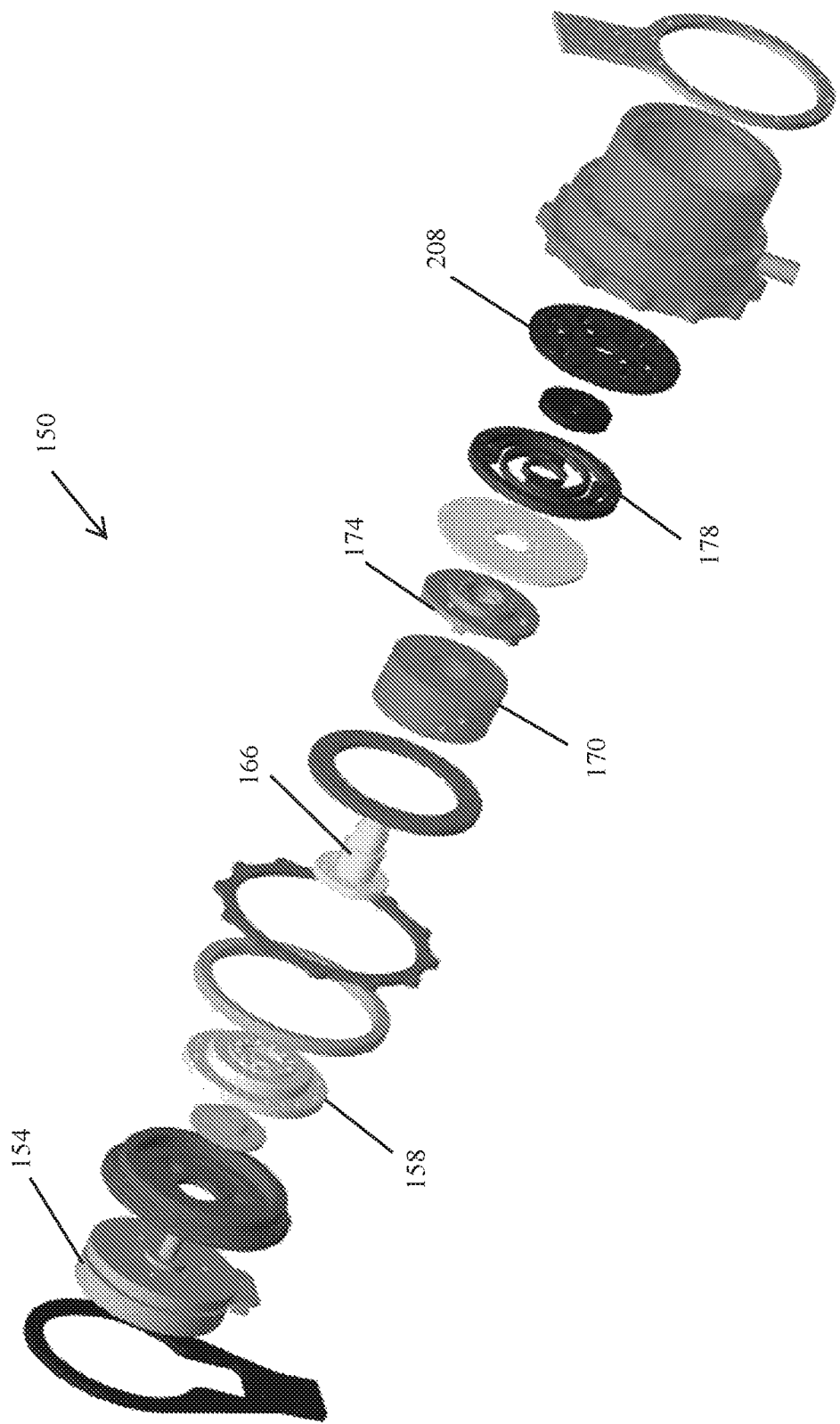
FIG. 6 is an exploded view of an actuator of the exoskeleton of FIG. 1.
Figure 7:
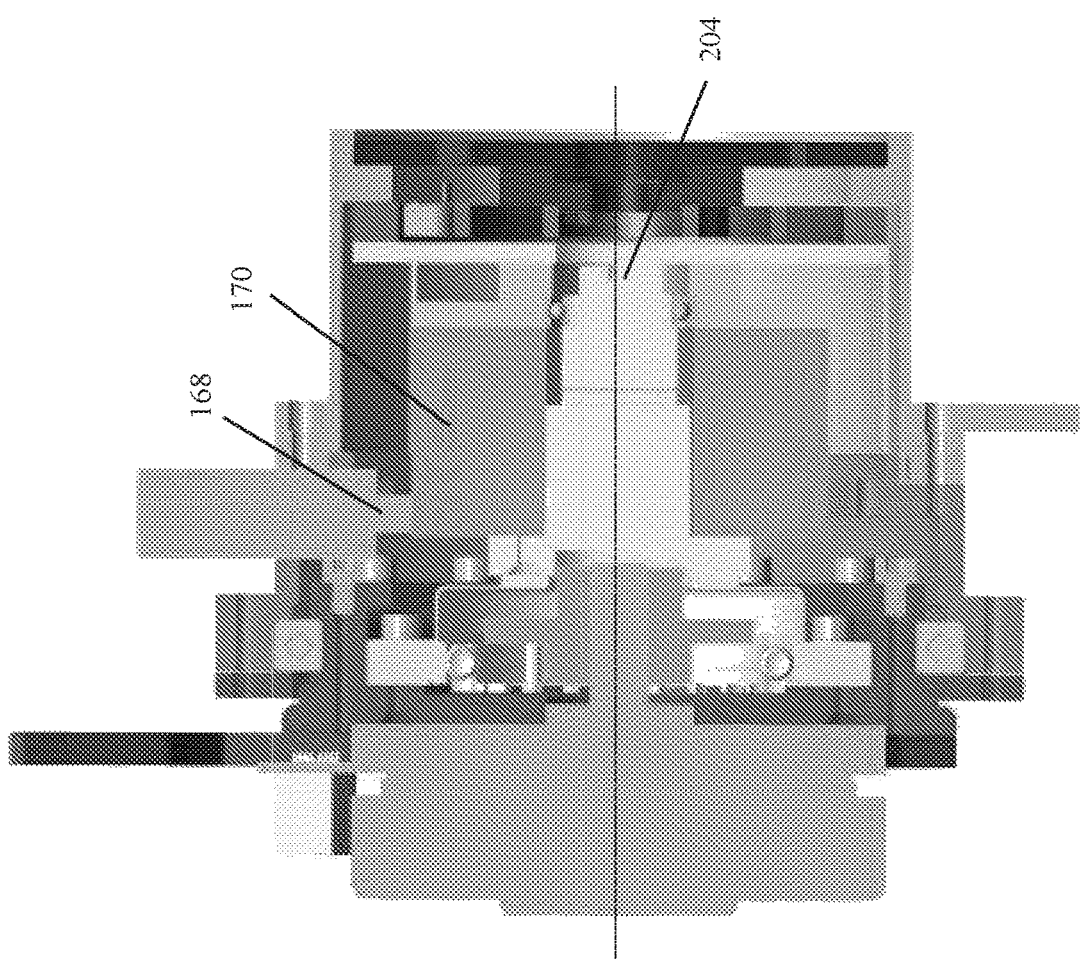
FIG. 7 is a sectional view of the actuator of FIG. 6.
Figure 8:
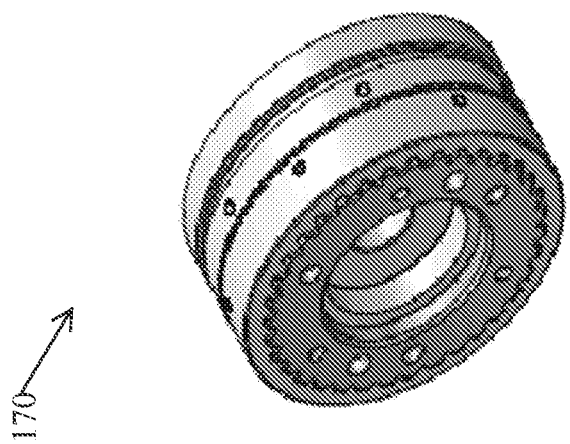
FIG. 8 is a perspective view of a clutch of the actuator of FIG. 6.

As shown in FIG. 6, each of the HAA joints 100, 108 and HFE joints 104, 112 includes an actuator 150, such as a series elastic actuator (SEA). The actuator 150 includes a motor 154, a harmonic gearbox 158, a transmission, a shaft 166, a clutch 170, a flange 174, and a spring 178. Each of the HAA joints 100, 108 and FIFE joints 104, 112 have a mass of between 1.5 kg and 1.8 kg.

In the illustrated embodiment, the motor 154 is a flat, brushless motor (e.g., a Maxon rotating, flat, brushless DC motor) with a continuous torque rating of 0.44 Nm. In other or additional embodiments, other suitable motors may be used. In other or additional embodiments, other suitable motors may be used. In the illustrated embodiment, the transmission ratio of the harmonic gearbox is 100:1, resulting in an approximate output torque of approximately 40 Nm, an approximate output velocity of 150 degrees/second, and a peak torque of approximately 80 Nm for durations on the order of a few seconds. In other or additional embodiments, other transmission ratios may be greater or less than 100:1.

The clutch 170 is a mechanical clutch that automatically disengages and engages the transmission. The clutch includes a clutch brush 168. For the clutch 170 in the illustrated embodiment, the maximum bearing is 100 Nm and the voltage is 24V, although other values are possible. In the illustrated embodiment, the clutch 170 is an electromagnetic tooth-type clutch, which ensures swift joint rotation and avoids unnecessary interaction between the respective support legs 30, 34 or side supports 104, 112 of the exoskeleton 10.

For example, although a hip joint of the human keeps rotating while the human is walking, the torque at the hip joint is close to zero in about 30-40% of gait cycle, which indicates that the hip does not need assistance and can function on its own under the influence of gravity during this portion of the gait cycle. However, the high impedance, which is related to the motor 154 and the transmission in the powertrain at each joint 100, 108, 116, 120, can generate interaction forces on the legs 22, 26 when the exoskeleton 10 cannot track the hip motion perfectly. These interaction forces are usually unexpected by and disturbing to the user. To prevent these undesirable interaction forces, a controller 304, discussed in greater detail below, can measure the interaction torque and detect when the hip does not need assistance in a certain joint. The clutch 170 can then permit the exoskeleton 10 to disconnect the motor 154 and the transmission from the powertrain of each joint during the period when assistance is not needed. That is, the clutch 170 is selectively disengageable from the motor 154.

Figure 9:
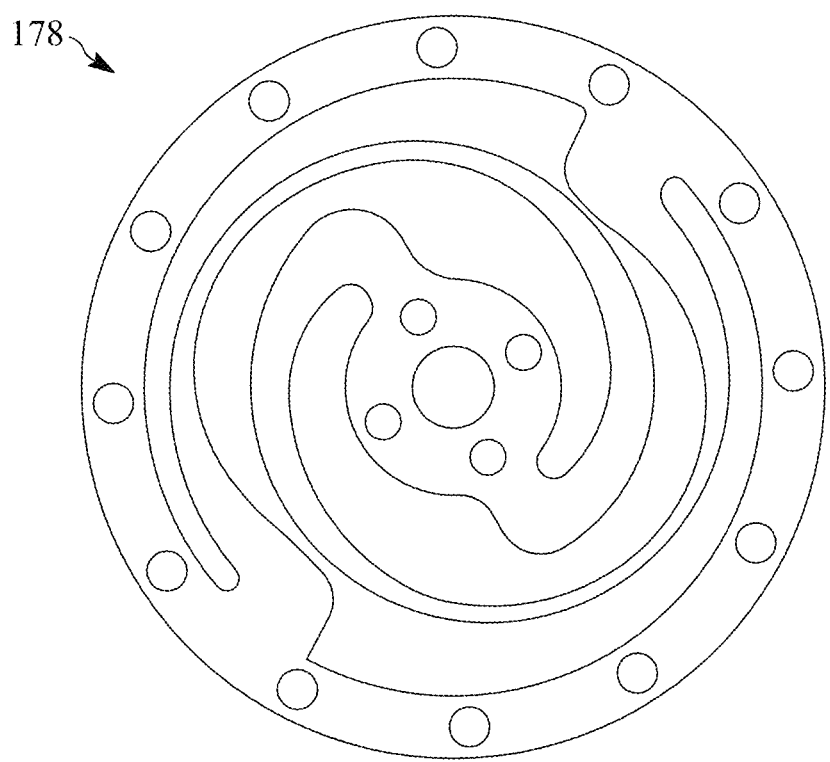
FIG. 9 is a plan view of a spring of the actuator of FIG. 6.
Figure 10:
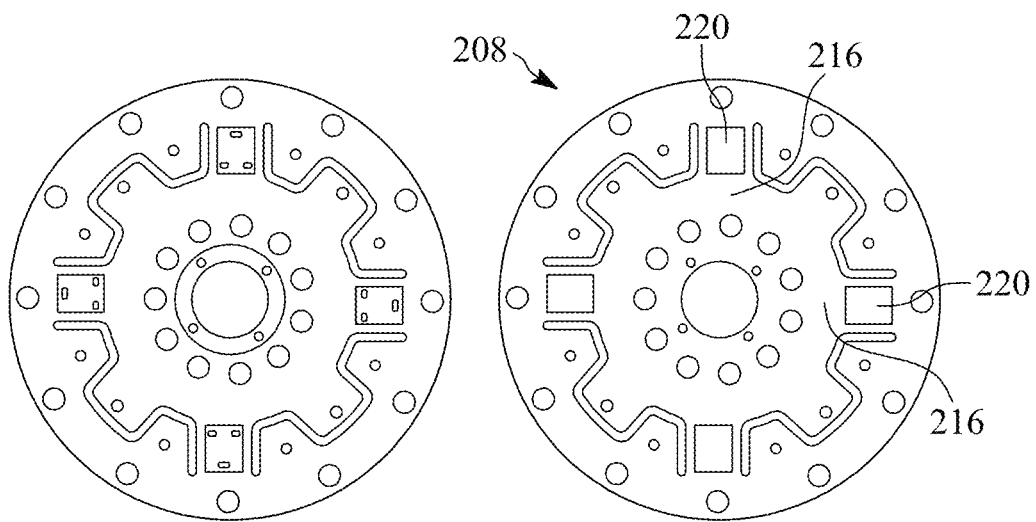
FIG. 10 are plan views of a torque sensor of the actuator of FIG. 6.

The spring 178 utilizes a monolithic disc-shape, as shown in FIG. 9. The monolithic disc-shaped design can reduce the thickness of the spring 178 and implies that the transfer of torque is between an outer annulus (external diameter of approximately 85 mm) and an inner annulus (internal diameter of approximately 12 mm). The material of the torsion spring 178 is 50 CrVA (i.e., titanium). When the torque exceeds the torsion spring's 178 peak torque, an internal hard stop will prevent damage. The design of the spring in the illustrated embodiment results in an angular series stiffness of 2 Nm/degree for ±15 degree, and allows 60 Nm bidirectional torque loading.

With reference to FIGS. 6-14, each actuator 150 includes a sensor system including an absolute position magnetic encoder 204 for measuring a joint angle of the joint 100, 108, 116, 120 it is associated with and a spring-based torque sensor 208 and/or a strain-based torque sensor 212. At least one of the torque sensors 208, 212 is configured to measure an "interaction torque", which is the difference between a trajectory of the support leg 30, 34 and the joint 100, 108, 116, 120 associated with that leg.

With particular reference to FIGS. 9-13, the structure of the spring-based torque sensor 208 and the respective finite element analysis (FEA) results are shown. The spring-based torque sensor 208 includes four strained beams 216 that are cross-shaped and a rectangular groove 220 is machined on each strained beam 216 as an elastomer to sense strain. The FEA analysis was set up with the inner ring 224 fixed, and an external torque was applied on the outer ring 228 (torque directions are shown with arrows 232). The results showed that the maximum stress and strain due to the torque both occurred in the middle region 236 of the strain beam's rectangular groove 220. When the maximum torque was 67.8 Nm, the maximum stress was 174.304 MPa and the maximum strain was $2.274 \times 10^{-3}$, the maximum calculated stress of the torque sensor is much less than the shear strength of 7075T6 aluminum alloy. The series spring stiffness may be approximately 400 Nm/rad.

Figure 11:
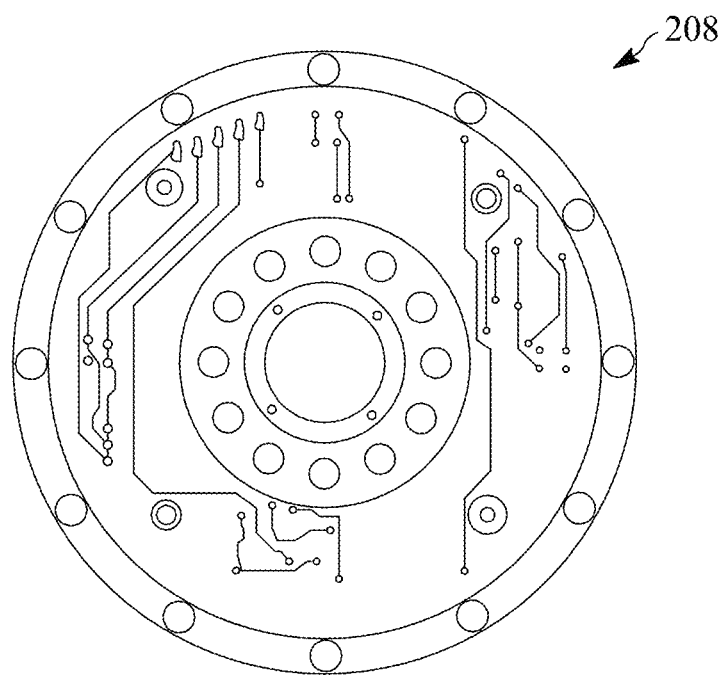
FIG. 11 is another plan view of the torque sensor of the actuator of FIG. 6.
Figure 12:
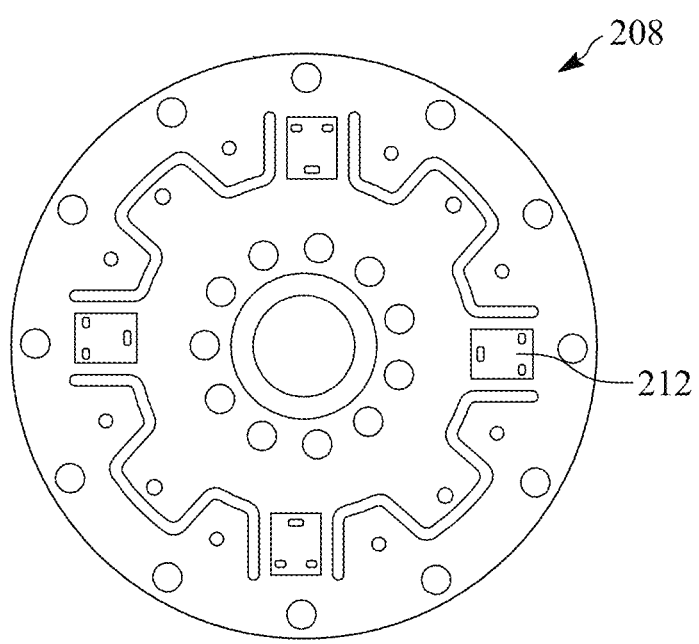
FIG. 12 is another plan view of the torque sensor of the actuator of FIG. 6.
Figure 13A:
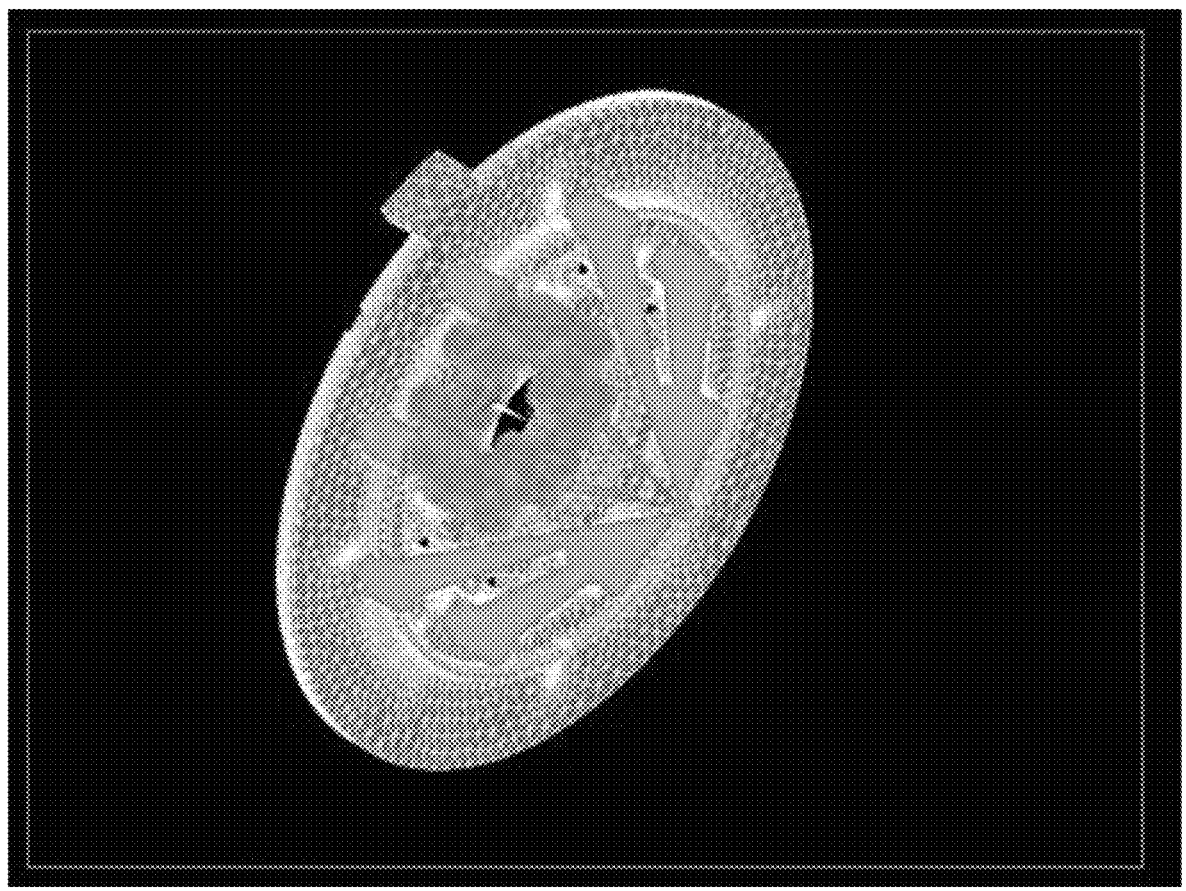
FIG. 13A illustrates a mesh grid used in a finite element analysis of the torque sensor of the actuator of FIG. 6.
Figure 13B:
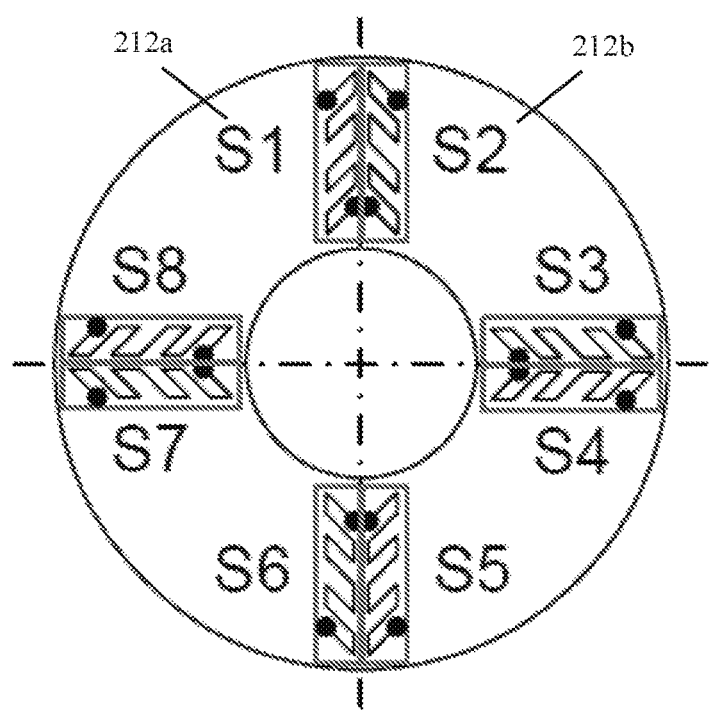
FIG. 13B is a schematic showing an arrangement of strain gauges of a portion of the torque sensor of the actuator of FIG. 6.
Figure 13C:
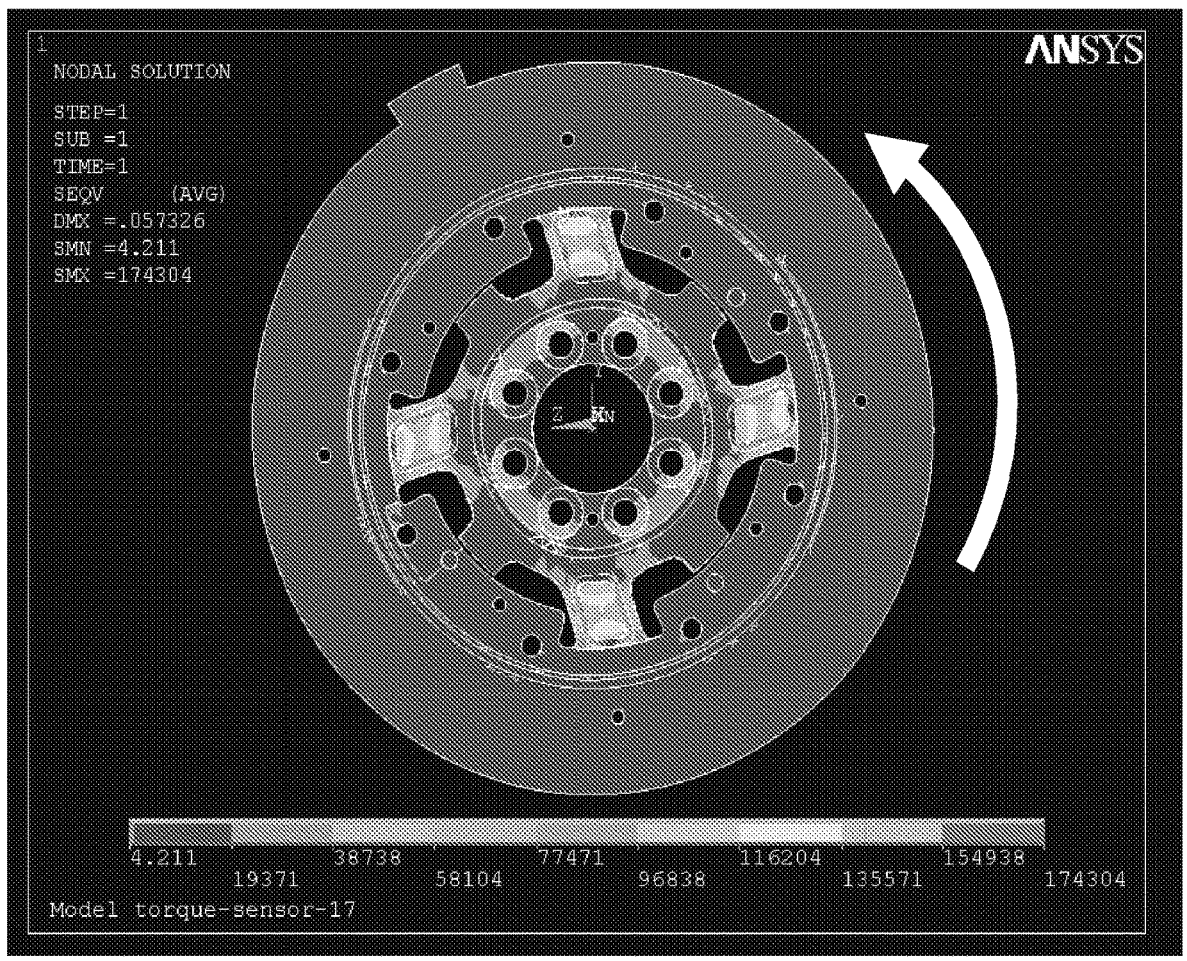
FIG. 13C illustrates the stress distribution in a finite element analysis of the torque sensor of the actuator of FIG. 6.
Figure 13D:
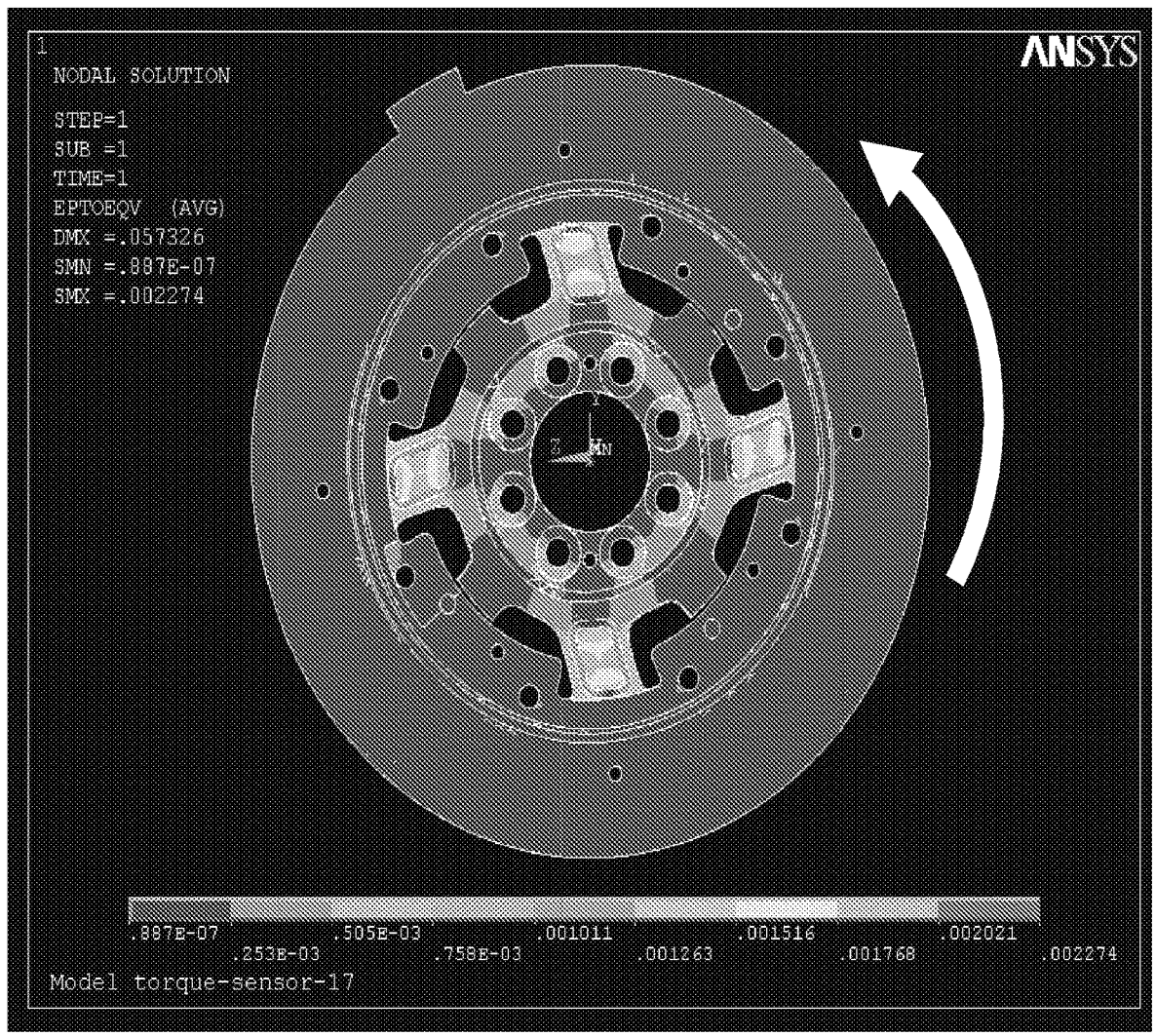
FIG. 13D illustrates the deflection distribution in a finite element analysis of the torque sensor of the actuator of FIG. 6.

Further with respect to FIGS. 11-12, the strain-based torque sensor 212 includes two strain gauges 212a, 212b that are coupled to the back of the rectangular groove 220 of each strained beam 216. The strain gauges 212a, 212b form on the two 180° strain girders a full Wheatstone bridge, so a total of two full Wheatstone bridge circuits are present in the sensor 212. The two full bridges will improve the reliability of the spring-based torque sensor 208 and reduce measurement errors due to thermal effects. In addition, the orthogonal arrangement of the cross shape allows easy algebraic averaging of the output of the two Wheatstone bridges, which can offset torque ripples caused by the harmonic reducer. The strain gauges in the illustrated embodiment have a resistance of 350Ω, and the strain coefficient of 2.06%, which results in high sensitivity, small drift, and good thermal stability. Additionally, an instrumentation amplifier is used in each Wheatstone bridges. The Wheatstone bridges are excited with 5 VDC, and a custom-made electronic circuit balances the bridges for null-point measurements and also amplifier the output by a factor of 100. The amplifier circuit contains a 312 Hz low-pass filter circuit to reduce the noise before analog-to-digital conversion. The linearity, hysteresis, and sensitivity of the torque sensor are 2.19%, 3.06%, and 0.41, respectively in the illustrated embodiment. Sensor noise was experimentally determined to be ±0.22 Nm, about 0.16% of the torque capacity.

Figure 14:
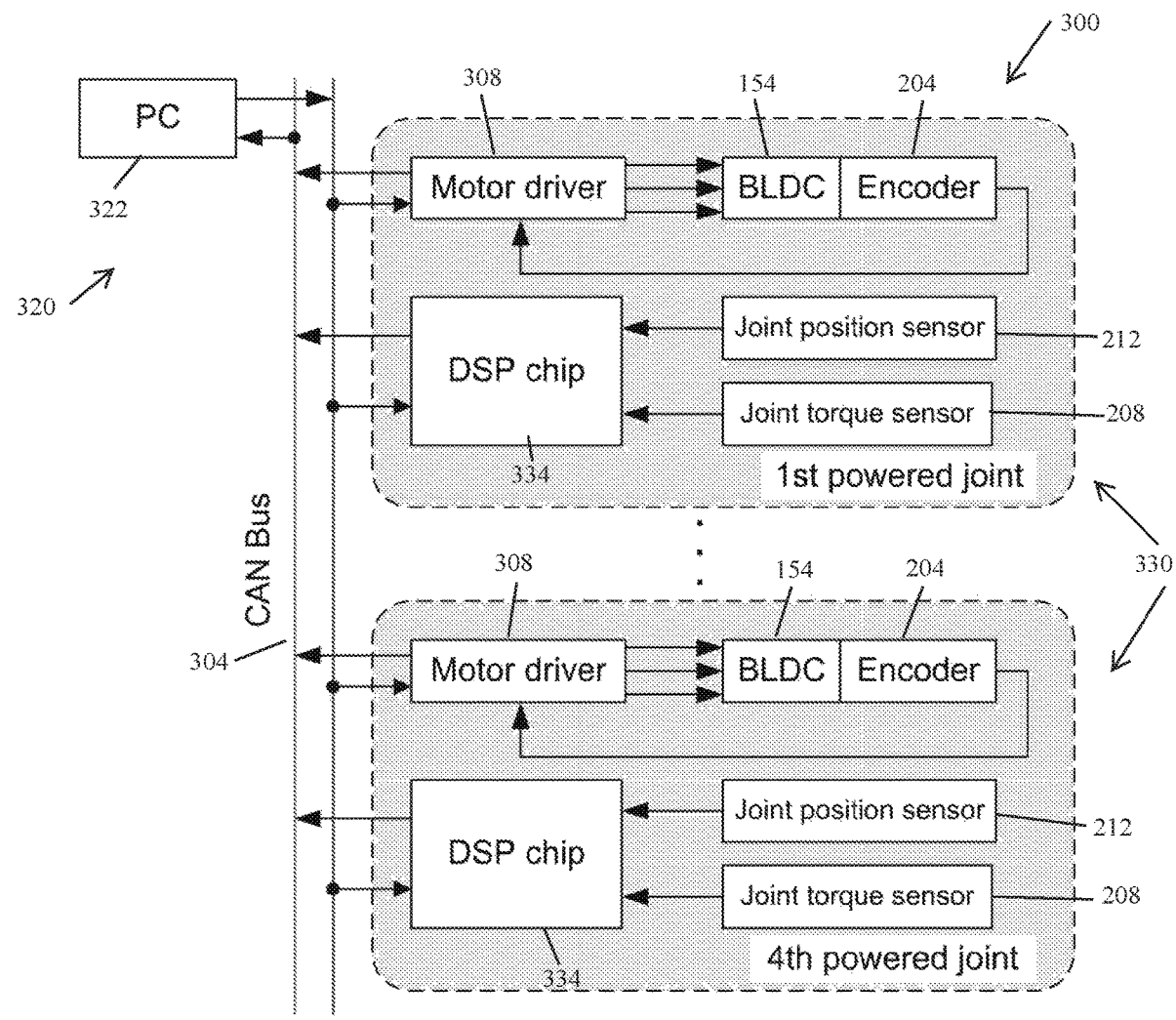
FIG. 14 is a schematic of the control system for the exoskeleton of FIG. 1, which includes a high-level subsystem and low-level control system.

FIG. 14 illustrates a control system 300 of the exoskeleton 10. The control system 300 includes a bus 304 (e.g., a CAN bus), which is modular and is set up in a hierarchical structure. The control system 300 includes a high-level sub-system 320 (a balance control approach) and a low-level sub-system 330 (an adaptive impedance control approach).

The high-level sub-system 320 includes a high-level controller 322 (e.g., a personal computer) and is based on a finite-state-machine 340. The high-level sub-system 320 analyzes inputs including the center of mass, step width, and step length, and then accordingly outputs adjustment angles for each joint 100, 108, 116, 120 based on the inputs.

The low-level sub-system 330 is based on admittance control and includes four individual low-level controllers 334 that respectively control each of the HAA joints 100, 108 and HFE joints 116, 120. Each joint 100, 108, 116, 120 includes a motor driver 308 (e.g., 150 W commercial brushless motor driver) to drive the motor 154 of each actuator 150. In the illustrated embodiment, the low-level controllers 334 are mini DSP chips that acquire data from the joint torque and position sensors 208, 212. For each joint, the respective low level controller 334 analyzes inputs including the adjustment angle from the controller 304 and the current joint angle, the angular velocity, the angular acceleration of the respective joint 100, 108, 116, 120. The low-level controller 334 also analyzes the interaction torque between the human's leg 22, 26 and that joint 100, 108, 116, 120. The low level controller 334 then outputs a specific torque for the respective joint 100, 108, 116, 120 to assist the human 14 in walking or stability.

The lower-level control sub-system 330 is updated at 2 kHz, with an inner current loop that is updated at 10 kHz, and the control parameters are updated by the high-level controller 334 at 100 Hz. The electrical system is powered by a 24 V benchtop DC power supply.

The controller 304 calculates the combined center of mass of the human 14 and the exoskeleton 10 in the frontal plane 74 and a step width in the sagittal plane 70 and frontal planes 74. Accordingly, the controller 304 is able to output an adjustment angle for each HAA joint 100, 108 and HFE joint 1116, 120 while the human 14 is wearing the exoskeleton 10 and walking. Based on the output adjustment angles for each of the HAA, joints 100, 108 and HFE joints 116, 120, the HAA joints 100, 108 and HFE joints 116, 120 are respectively rotated in order to pivot the side supports 104, 112 and thereby assist in stabilizing the human 14 and assist the human 14 in walking.

To ensure the safety of both the human 14 and the exoskeleton 10, various mechanical, electrical and software-related safety protections were considered in exoskeleton design. The safety is ensured through software supervision as well as protection features within electronic and mechanical systems. The software supervision and electronics provide active protection, whereas the mechanical protection is passive. For active protection, the control software continuously monitors the velocity, motor current, temperature, torque and position sensor readings, and communication status of each actuator 150. If any reading is out of the safe ranges and/or incorrect, the drivers 308 will stop the motors 154 and display a warning. For passive protection, the exoskeleton features mechanical end stops for all four powered joints 100, 108, 116, 120 to prevent the exoskeleton 10 from exceeding its specified ranges of motion. The actuators 150 are also back-drivable, and the exoskeleton 10 has no sharp edges.

In operation, the human 14 wears the exoskeleton 10 and while the human is walking, the IMU 58 measures acceleration, velocity and orientation of the human 14 or the upper body 18 of the human 14 in the frontal plane 74. Each foot-pressure sensor array detects foot-ground contact and foot-off events. Based on the measurements from the foot-pressure sensor array and the IMU 58, the controller 304 is able to calculate a center of mass and a step width in the frontal plane 74. Based on the center of mass and step width in the frontal plane 74 and the sagittal plane 70, the controller 304 outputs a first adjustment angle for the first HAA joint 100 and a second adjustment angle for the second HAA joint 108. The controller 304 then causes the first HAA joint 100 and the first side support 104 to rotate based on the first adjustment angle, thus assisting the first leg 22 for abduction and adduction movement in a direction parallel to the frontal plane 74. The controller 304 may also rotate the second HAA joint 108 and the second side support 112 based on the second adjustment angle, thus assisting the second leg 26 for abduction and adduction movement in a direction parallel to the frontal plane 74. In this manner, the exoskeleton 10 assists the human 14 in stabilizing in the frontal plane 74.

Several experiments were conducted using the exoskeleton of FIGS. 1-9 for walking assistance.

As discussed below, Experiment 1 was conducted to show the functionality of the balance controller based on the XCoM, for maintaining walking stability and improve lateral balance. As discussed, controller reacts to perturbations in balance and produces a compliant guidance force through a combination of the passive elasticity of the SEA and active compliant control based on adaptive admittance control.

The controller 304 is configured to perform two main tasks: assistive walking and maintaining walking stability. Accordingly, the control strategy of the exoskeleton 10 can be subdivided into strategies for locomotion and balance control.

Figure 15:
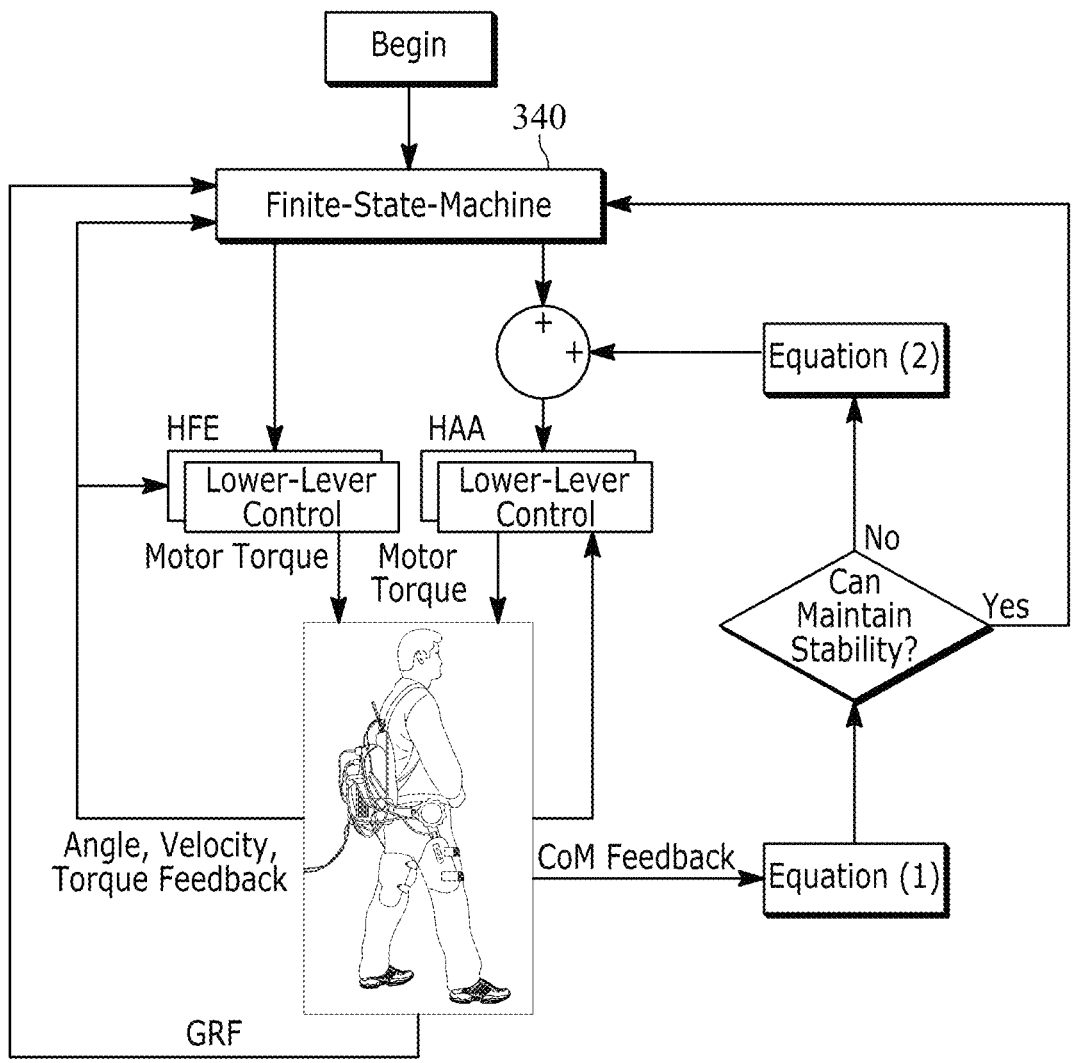
FIG. 15 is another schematic of the control system for the exoskeleton of FIG. 1.
Figure 16:
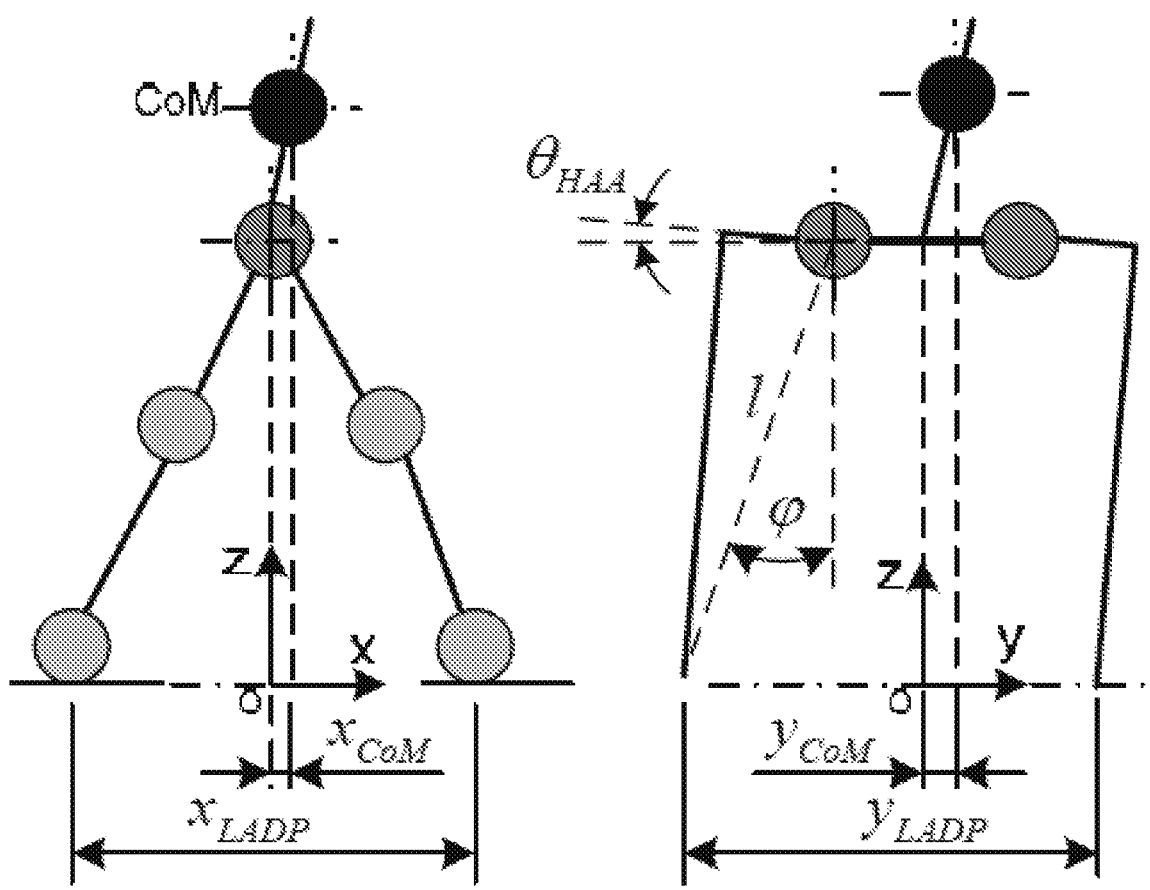
FIG. 16 is a schematic of the estimation of the CoM position in the sagittal plane and the frontal plane.
Figure 17:
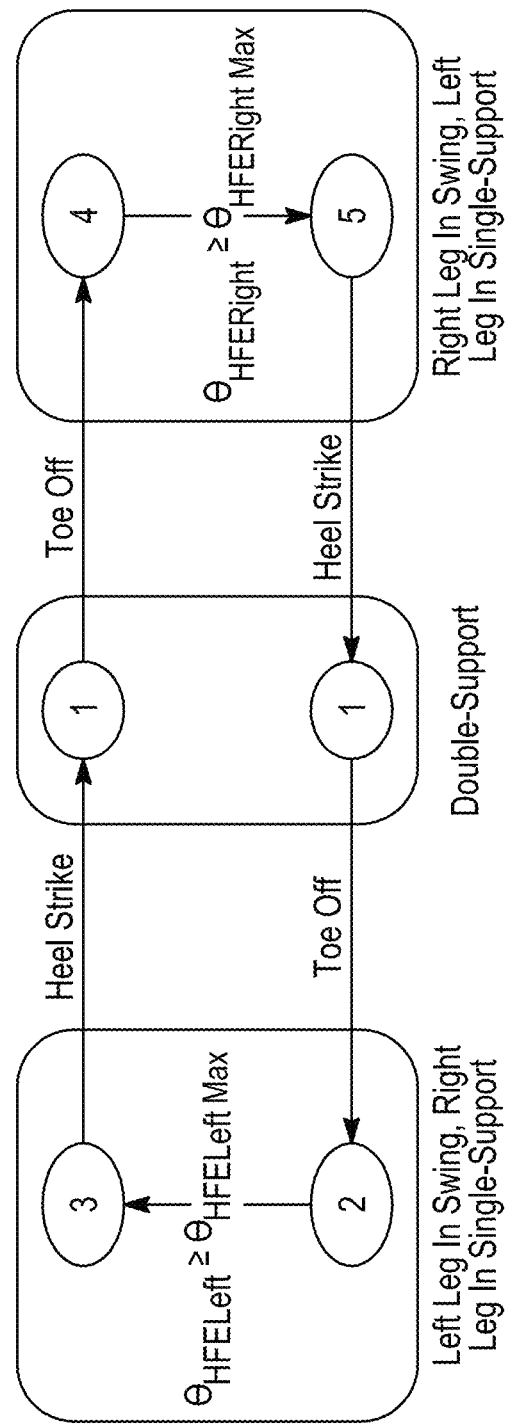
FIG. 17 is a schematic of finite-state machine switching machines from Experiment 1.

The scheme of control system 300 is shown in FIGS. 15-17. As implemented in the high-level controller 322, a finite-state machine 340 (FIG. 17) governs the walking behavior of the exoskeleton 10. During normal assistive walking, the exoskeleton 10 is controlled by the high-level sub-system 320 based on the finite-state-machine 340 and the low-level sub-system 330 is based on admittance control. If any loss of stability is detected, the exoskeleton 10 will immediately add a new control input to prevent the wearer from losing stability.

Five gait-phase states (FIG. 17) are defined for assisted walking: left-leg early swing (flexion), left-leg late swing (extension), double support, right-leg early swing (flexion), and right-leg late swing (extension). Each state consists of parameters describing the impedance of the four hip joints, including the joint stiffness (K), damping (D) and equilibrium angle ($\theta 0$), as well as transition criteria, During operation, the states are concatenated to produce seamless locomotion behavior. The low-level controllers 334 are admittance-based controllers that were chosen to cooperatively render the joint impedance with the integrated series compliance within the actuator 150.

During human walking, step-width adaptation and weight shift are crucial for maintaining lateral stability. However, individuals with muscular weakness may have difficulty performing these stability tasks. Thus, to support the wearer and maintain balance in both the sagittal and frontal planes, both the HAA joints and the HFE joints must be powered. The exoskeleton needs to support a walking speed of up to 0.8 m/s. The dimensions of the device should accommodate the hip width and other anthropometric features within the 5%-95% range of the adult population.

The design parameters of the actuation unit in Experiment 1 are critical for meeting the kinematic and dynamic requirements of the exoskeleton 10. The design parameters are calculated for an 80-kg person. The design parameters include an HFE range of motion of +110/−18 and an HAA range of motion of 19/−22. Additionally, each actuator should provide a continuous torque of 40 Nm, a maximum torque of 80 Nm and a maximum joint velocity of 150 degrees/s based on the hip angle and torque profiles. The output torque resolution should be 1 Nm. The exoskeleton 10 is expected to generate up to 50% of the torque required during human ground-level walking at a natural cadence of 105 steps/min. We adopted an exoskeleton mass limit of 12 kg that is similar to other commercial exoskeleton that are designed to help people with mobility impairments to stand upright and walk. The joint mas should be as light as possible.

Experiment 1 was designed to produce controllable mediolateral forces on the legs during walking. Incorporating compliance is also important for the exoskeleton when considering dependability, intrinsic stability, inherent safety, energy management, and environmental adaptability.

Given its close interactions with its human wearer, the exoskeleton was designed to be compatible with the user's range of joint motion, anthropometry, and kinematics to provide a good fit and a comfortable physical human—robot interface. In addition, the exoskeleton's actuation and control was designed to allow the wearer to perform his or her own movements without hindrance while still safely receiving assistance.

As will be shown, besides the machine design, the balance controller is important for maintaining balance in both the sagittal and frontal planes and considers the human-machine interaction. The exoskeleton controller assists the wearer in achieving dynamic stability during walking. To maintain lateral balance, the controller continuously monitors and adjusts the HAA movement during the swing phase to correct the step width and weight shift. In the case of perturbations from either external sources or the wearer's own motions, the exoskeleton will assist with changing foot placement position to widen/narrow the step width to counter balance losses.

In addition to the design features discussed above, for Experiment a, the series spring is a torsional spring that has a double-spiral disc shape and is made of a single piece of high-grade titanium. Each SEA weighs approximately 1.5 kg, of which the motor contributes 0.6 kg.

The exoskeleton controller must perform two main tasks: assistive walking and maintaining walking stability. Accordingly, the control strategy of the exoskeleton was subdivided into strategies for locomotion and balance control.

Again, five gait-phase states are defined for assisted walking: left-leg early swing (flexion), left-leg late swing (extension), double support, right-leg early swing (flexion), and right-leg late swing (extension). Each state consists of parameters describing the impedance of the four hip joints, including the joint stiffness (K), damping (D) and equilibrium angle, as well as transition criteria. During operation, the states are concatenated to produce seamless locomotion behavior. An admittance-based controller was chosen to cooperatively render the joint impedance with the integrated series compliance within the SEA mechanism.

With respect to FIG. 17, a finite-state machine uses the outputs from an inertial measurement unit (IMU) and resistive foot-pressure sensor to estimate the switching conditions between the finite states of the state machine. The gait phase switches from single-support to double-support states via detection of heel strike of the respective swing leg, which can be measured by resistive foot-pressure sensors. The gait phases are: 1-double support, 2-left-leg early swing (flexion), 3-left-leg late swing (extension), 4-right-leg early swing (flexion), and 5-right-leg late swing (extension). Switching between 2 and 3, or 4 and 5, is done by comparing current HFE angles with maximum hip flexion angle for each leg. An IMU was attached on the front of each thigh to measure the maximum hip flexion angle in real-time. The stride time is measured by the exoskeleton 10 controller's timer as the time between two consecutive heel strike events on the same foot. The expected maximum hip flexion angle is estimated from the average of the previous two strides. The maximum hip flexion angles and the maximum hip extension angles at the first two strides are measured by joint angle sensors during walking at zero-torque control mode. Maximum hip flexion angles are updated in real-time within the admittance controller, which is based on the interaction torque between the exoskeleton 10 and wearer.

Balance control. As discussed above, and with renewed reference to FIG. 16, Equation 1 gives the ratio to detect disturbance where $r_{lateral}$ is the weight shift ratios in the frontal planes, respectively; $y_{CoM}$ and $y_{LADP}$ are the COM position and step width, respectively, in the frontal plane is shown in FIG. 16.

Based on the XCoM concept, the XCoM position in the lateral plane is defined in Equation 2 where CoMy and $V_{CoMy}$ are the lateral CoM position and velocity, respectively, and $\Omega_0$ is the eigenfrequency of the pendulum $\omega_0 = \sqrt{g/l}$ where l is the length of the pendulum and g is the acceleration due to gravity. Equation 3 as noted above gives the extrapolated center of mass where $y_{CoM}^{bs}$ and $y_{CoMz}^{bs}$ are the nominal values of the XCoM position and velocity during normal walking without perturbations and $\Delta V_{CoMy}$ is the acceleration of CoMy.

When the $r_{lateral}$ exceeds the thresholds, the $\Delta \theta_d^{HAA}$ add to the finite state machine. The HAA adjustment angle is given as Equation 4.

With continued reference to FIG. 15, the finite-element machine controls both HFE joints 116, 120 and HAA joints 100, 108 during normal walking. With respect to Equation 1 below, the ratio to detect disturbance is given as:

$$r_{lateral} = \frac{y_{CoM}}{y_{LADP}} \quad (1)$$

where $r_{lateral}$ is the weight shift ratios in the frontal planes 74, respectively; $y_{CoM}$ and $y_{LADP}$ are the CoM position and step width, respectively, in the frontal plane 74 is shown in FIG. 16. When the $r_{lateral}$ exceeds the thresholds, the $\Delta \theta_d^{HAA}$ add to the finite state machine 340. The HAA adjustment angle is given as Equation 2, below:

$$\Delta \theta_d^{HAA} = \arcsin\left(\frac{\Delta XCoM_y}{L} + \sin \varphi\right) - \varphi \quad (2)$$

At each sample, $\Delta \theta_D^{HAA}$ can be computed and added to the nominal angle $\Delta \theta_d^{HAA}$. The value of $\varphi$ can be calculated from the HAA angles.

The XCoM position in the lateral plane is defined as Equation 3:

$$XCoM_y = CoMy + \frac{v_{CoMy}}{\omega_0} \quad (3)$$

where CoMy and $V_{CoMy}$ are the lateral CoM position and velocity, respectively, and $\omega_0$ is the eigenfrequency of the pendulum $\omega_0 = \sqrt{g/l}$ where l is the length of the pendulum and g is the acceleration due to gravity. The Equation 4 below gives the extrapolated center of mass as:

$$\Delta XCoM_y = \Delta CoMy + \frac{\Delta v_{CoMy}}{\omega_0} \quad (4)$$

$$= CoMy - y_{CoM}^{bs} + \frac{v_{CoMz} - v_{CoMz}^{bs}}{\omega_0}$$

where $y_{CoM}^{bs}$ and $y_{CoMz}^{bs}$ are the nominal values of the XCoM position and velocity during normal walking without perturbations and $\Delta V_{CoMy}$ is the acceleration of CoMy.

The step width is adjusted only during the swing phase (single support), and two adjustment strategies are used, depending on the tilt direction during the swing phase. For the left-leg swing phase (right-leg support), when $r_{lateral}$ is below the lower threshold (the CoM is tilted to the right side of the sagittal plane), the powered HAA adjustment angle is given as Equation 5 below:

$$\begin{cases} \theta_{k+1}^{LeftHAA} = \theta_k^{LeftHAA} + \Delta \theta_d^{HAA} \\ \theta_{k+1}^{RightHAA} = -\theta_{k+1}^{LeftHAA} \end{cases} \quad (5)$$

This adjustment will result in greater hip abduction at heel strike and a larger step width to recover balance. By contrast, when $r_{lateral}$ exceeds the upper threshold (the CoM is tilted to the left side of the sagittal plane), the powered HAA adjustment angle is given as Equation 6 below:

$$\begin{cases} \theta_{k+1}^{LeftHAA} = \theta_k^{LeftHAA} + \Delta \theta_d^{HAA} \\ \theta_{k+1}^{RightHAA} = \alpha \cdot \theta_{k+1}^{LeftHAA} \end{cases} \quad (6)$$

where $u_a$ is a proportionality factor. This HAA adjustment will shift the CoM to the left to recover balance. The behavior during the right-leg swing phase is similar. A similar control law is applied to right-leg swing.

The balance controller output is target adjustment angles of both HAA angles. The adaptive admittance controller considers the interaction torque between the wearer and the exoskeleton to produce an adaptive assistance torque to achieve balance controller outputs. The adjusted reference trajectory $\theta_{adj}$ is given by Equation 7, below, where s is the Laplace operator.

$$\begin{cases} \theta_{adj} = \theta_0 + \theta_{int} \\ \theta_{int} = -A(s)\tau \\ \frac{A(s)}{s} = \frac{1}{K + zD} \end{cases} \quad (7)$$

where $\theta_{int}$ is the angle related to the interaction torque $\tau$ between the exoskeleton and the wearer's joint. This angle is estimated using the virtual impedance parameters D and K of the exoskeleton, and it increases or decreases proportionally to the interaction torque between the wearer and the exoskeleton. An increase in the interaction torque indicates a greater difference between the trajectory of the wearer's limb and the trajectory of the exoskeleton.

The concept of assistance as needed is implemented by varying the joint stiffness. The variation in stiffness can be determined based on the performance of the wearer and the level of assistance to be exerted by the exoskeleton 10 based on Equation 8:

$$\begin{cases} K_{T+1} = K_T + \Delta K \\ \Delta K = \dfrac{\theta_0 - \theta}{\varepsilon \tau} \end{cases} \quad (8)$$

where ε is a confidence factor in the interval [0,1], which is used to determine the stiffness to be applied at sample time T+1. A low confidence factor means that partial or complete balance assistance should be provided, whereas a higher confidence factor indicates that the subject is capable of balance control with little or no assistance.

Figure 18:
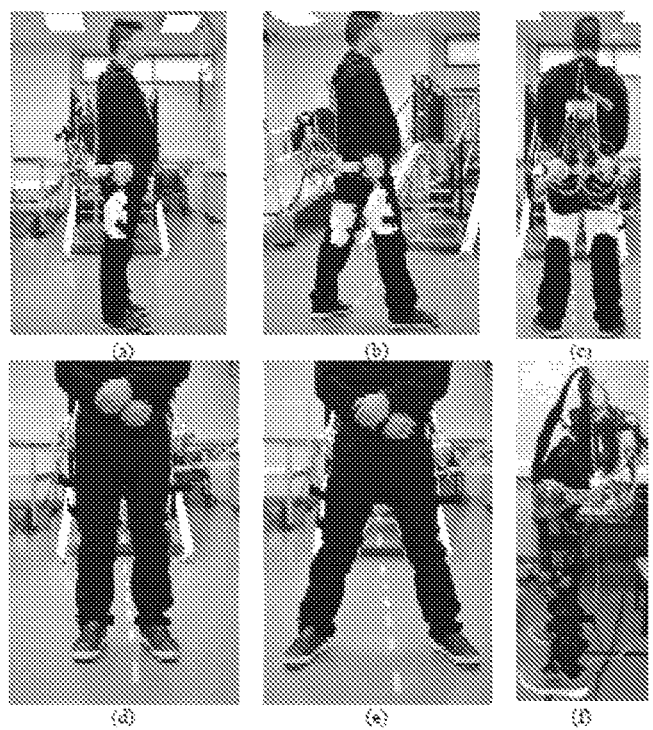
FIG. 18 shows the exoskeleton during use in Experiment 1.

Exoskeleton System Performance. The torque and speed performance characteristics of the powered joints of the exoskeleton 10 were experimentally quantified. The exoskeleton 10 was connected to a standard knee-ankle-foot orthosis to support its weight (see FIG. 18).

Because of the high transmission ratio of the SEA, the maximum angular velocity of each joint is limited by the motor driver of the motor, which operates at 24 V. The maximum joint angular velocity of the powered joints, as measured using motor Hall sensors, is approximately 150 deg/s. The maximum output (i.e., the continuous torque of the powered joints as measured using joint torque sensors) is approximately 40 Nm.

Figure 19:
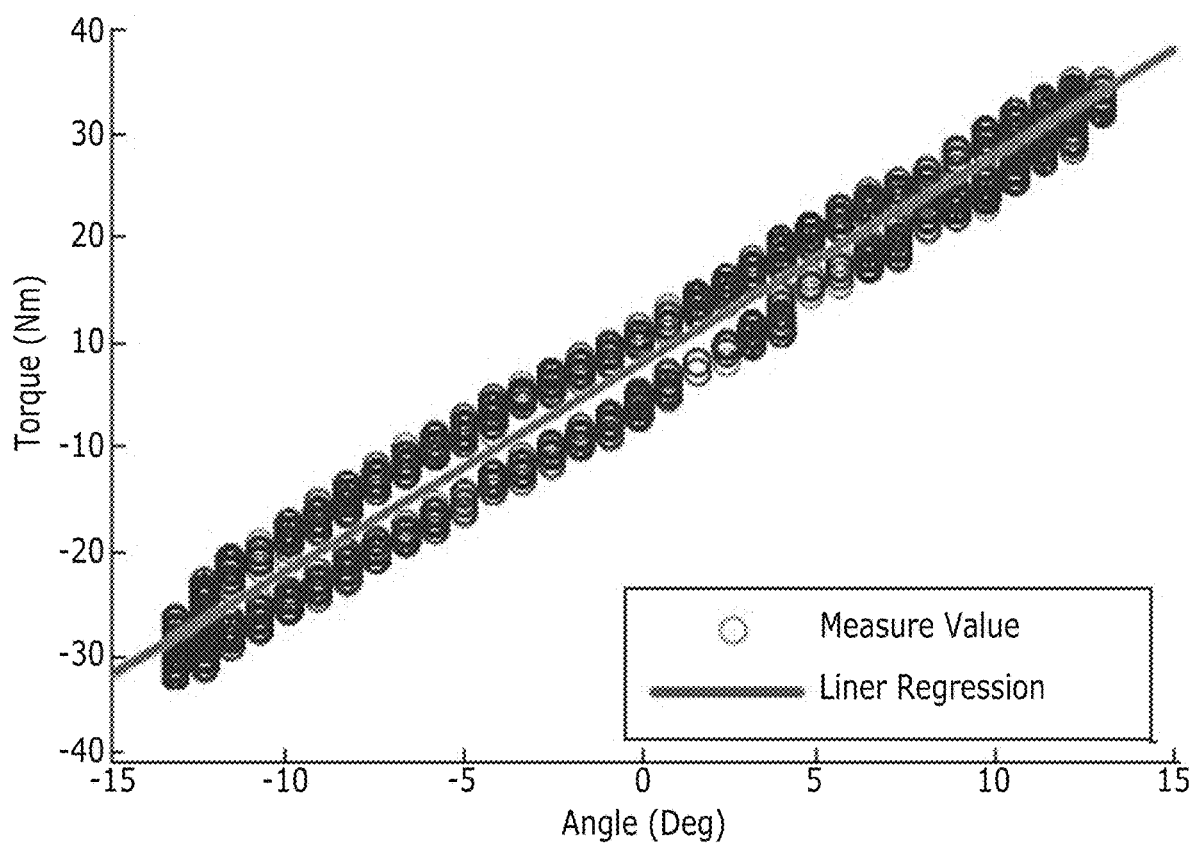
FIG. 19 illustrates the torque-angle relationship of the actuator of FIG. 6 without active control under loading and unloading as discussed with respect to Experiment 1.

The torque-angle relationship of the SEA with no control under loading and unloading, i.e., with the motor turned off, is shown in FIG. 19. The figure demonstrates that the joint is back-drivable even with no power. The slope of the red line represents the desired design stiffness, and the actual results are shown in blue. The relationship was nearly linear (non-linearity is 2.12%), and the hysteresis was small (4.81%). The results demonstrate that the SEA satisfies the design objective, with a stiffness of 2.156 Nm/deg.

Figure 20:
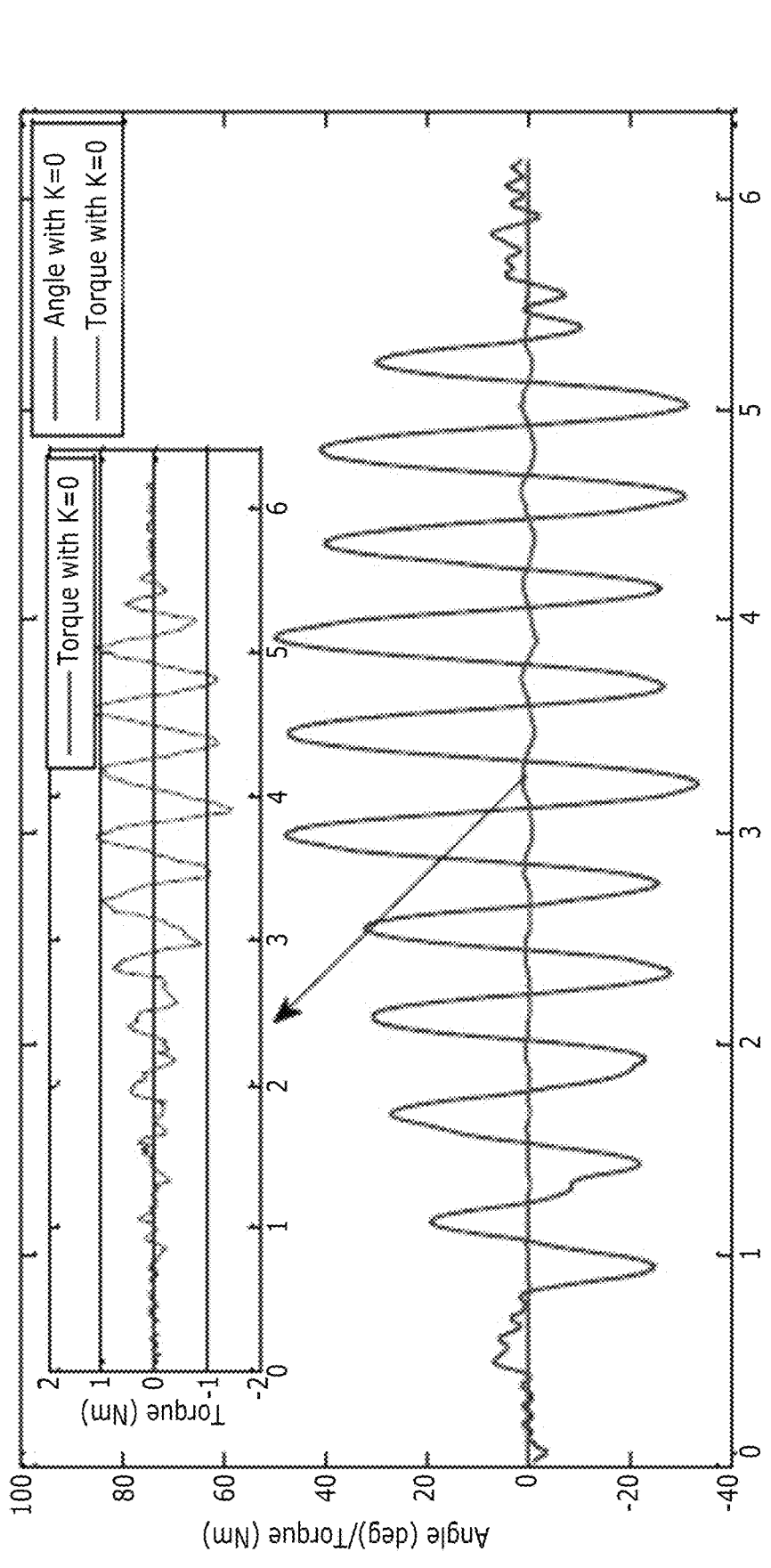
FIG. 20 illustrates results from Experiment 3 that validate the admittance controller for different stiffnesses.
Figure 20:
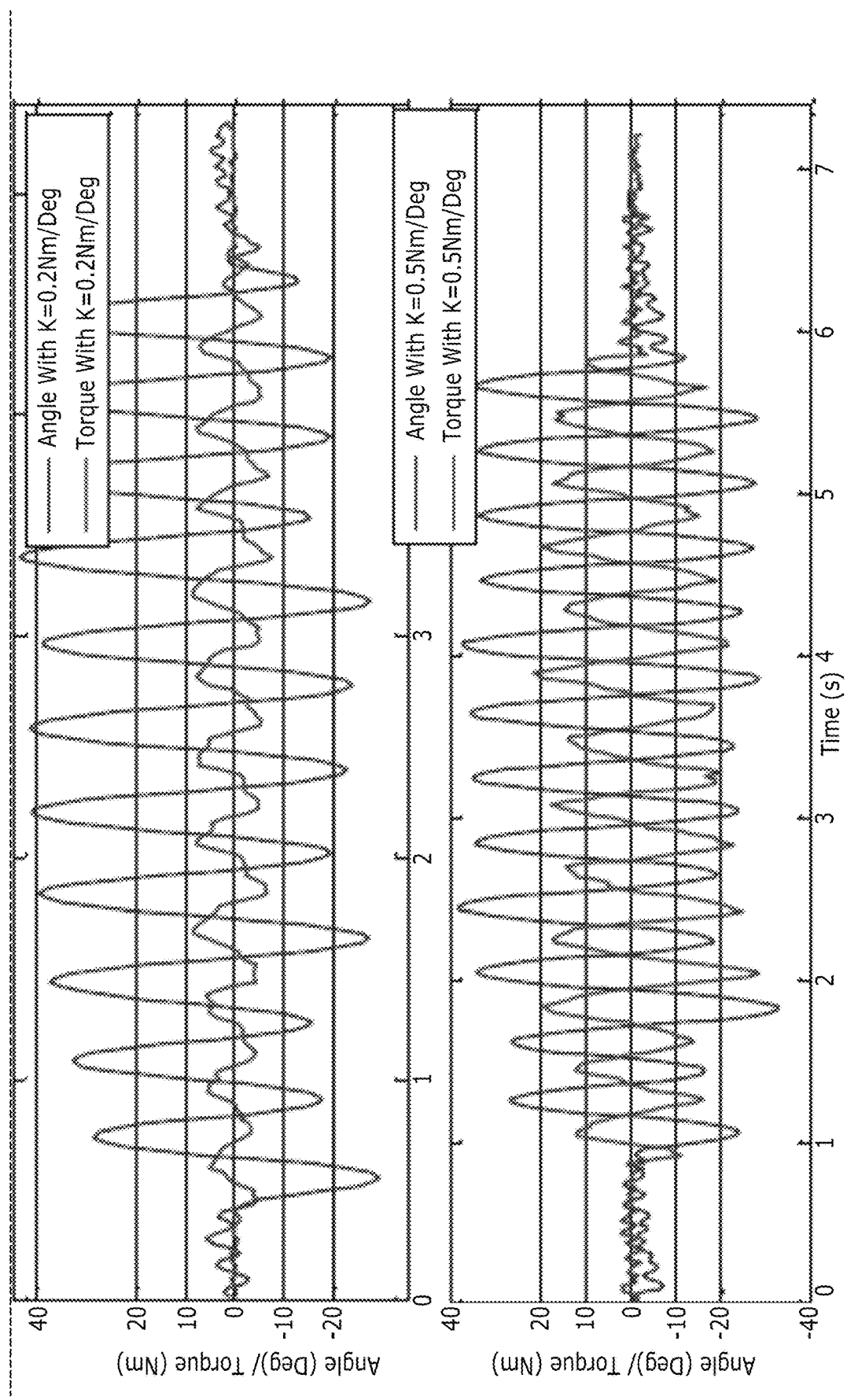

Three experimental trials were conducted to validate the admittance controller. During these trials, a dynamic external force (pulling and pushing at a frequency of less than 2 Hz) was manually exerted on the pivoting link. The stiffness was set to values of 0 Nm/deg (zero-torque control mode), 0.2 Nm/deg, and 0.5 Nm/deg. When K=0, the interaction torque was very close to zero. The absolute torque value was smaller than 1.3 Nm with the stiffness set to 0. At a low frequency, the interaction torque was also near zero, with minor peaks at approximately 0.4 Nm. As the frequency of the excitation increased, the interaction torque continued to oscillate with peak heights below 1.3 Nm. At all frequencies tested, the zero-impedance control was stable. FIG. 20 also shows that for the same angle, different interaction torques (different compliance patterns) can be realized by varying the stiffness (K=0.2 and K=0.5).

Experimental evaluation of the controller—experimental protocol. The gaits of three healthy subjects (males, age 28±3, weight 78±5 kg, height 174±3.0 cm) were used.

Subjects were asked to perform normal walking on a treadmill at their preferred walking speed. A cable suspension system (Zero-G, Aretech, Washburn, Virginia) was connected to the subject via straps in the backpack vest to prevent falling. For each subject, different sets of initial impedance properties were used for different gait phases, and an example is shown in FIG. 21. Damping values were held constant and joint stiffness could be changed by the controller throughout the trials to achieve synergy and compliance as discussed above.

During the first few trials for each subject, no perturbation was given and the weight shift thresholds were determined. Subsequent trials that included perturbations were divided into three sets. Manual pushes were given by an experimenter from one sides of the treadmill during both legs single support gait phase. Placebo pushes were sporadically introduced to prevent subjects' adaptation and anticipatory responses.

For the first set, the subject's equilibrium angles were set to zero during double support, and the subject was asked to walk on a treadmill at a walking speed of 0.45 m/s. For the second set, the HFE's equilibrium angles were set to be non-zero at double support phase and the gait phases were slightly modified to evaluate the controller's flexibility and generate more natural gait patterns. The subject was asked to walk on a treadmill at a slightly higher walking speed of 0.65 m/s. For the third set, impedance and angle values were set back to the value of the first set, and the majority of perturbations were given at the same gait phase (left-leg early swing) to evaluate the performance of the assist-as-needed strategy.

Figure 22:
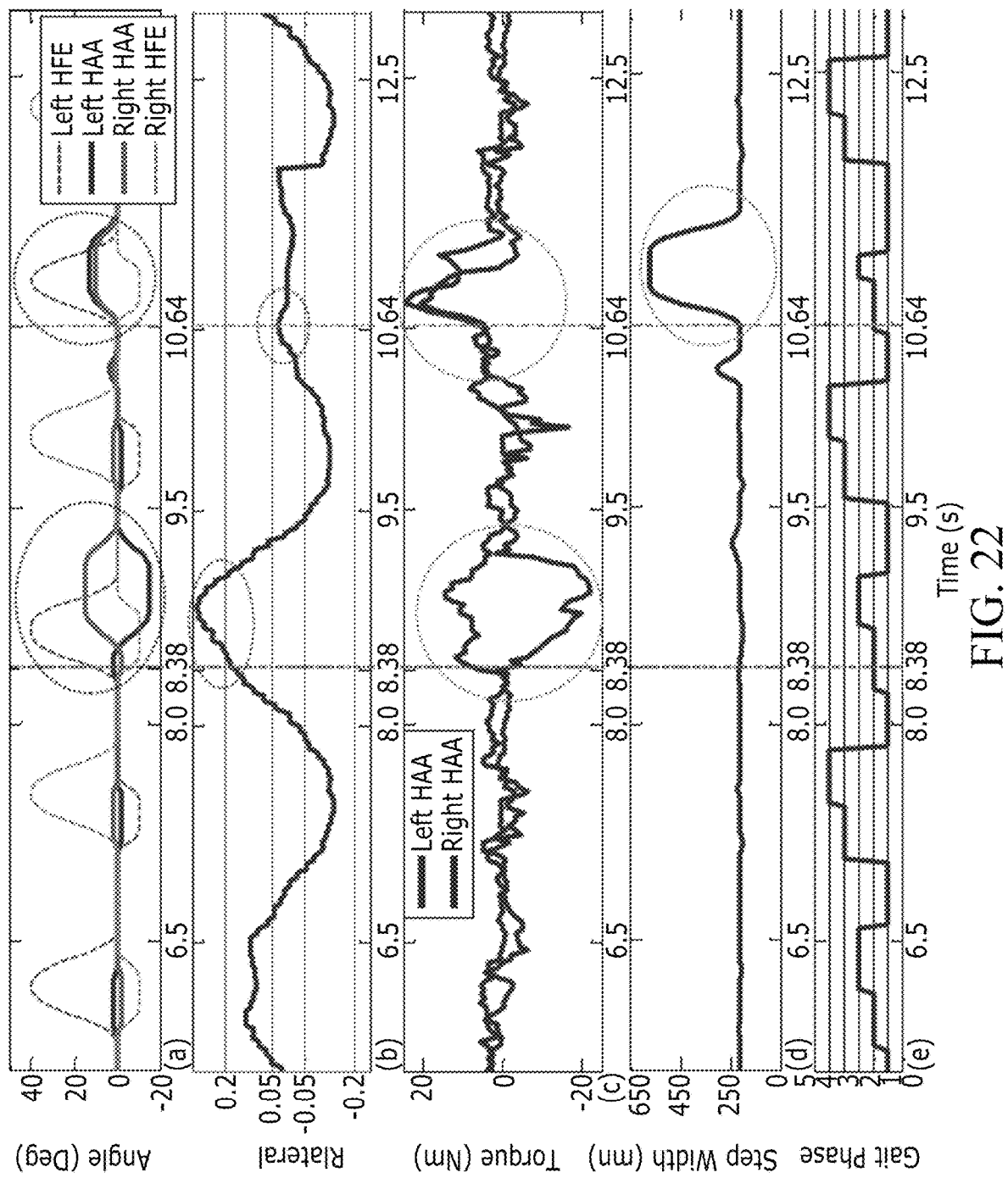
FIG. 22 illustrates results from straight walking with step-width correction during Experiment 1.

Experimental evaluation of the controller—results of experiment 1-I. The experimental results from a representative trial are shown in FIG. 22. During normal walking, the weight shift ratios and CoMy varied little within a given period (e.g., a swing phase). The weight shift ratios in the sagittal and frontal planes during this test can be estimated from the test data. The weight shift ratio in the sagittal plane, $r_{lateral}$, remained within a range with an upper threshold of 0.2 and a lower threshold of 0.05 during the left-leg swing, whereas $r_{lateral}$ remained within a range between an upper threshold of −0.05 and a lower threshold of −0.2 during the right-leg swing.

In this trial, perturbations were introduced at approximately 8.38 s (the first vertical red dashed line) and 10.64 s (the second vertical red dashed line). After the onset of the first and second perturbations, the weight shift ratio in the frontal plane exceeded the preset maximum and minimum thresholds, respectively. For the perturbation applied at 8.38 s, the current gait phase was the left-leg swing, and the perturbation was from the swing side to the stance side. This resulted in both HAA joints attempting to shift the wearer's weight to his left leg to avoid further tilting to the right. For the perturbation applied at 10.64 s, the current gait phase was also the left-leg swing, but the direction of the perturbation was reversed. The results showed higher hip abduction levels in both joints at the heel strike and a wider step width, as seen in FIG. 22. After each perturbation, all angle changes returned to their values for normal walking. The measured interaction torques applied by the HAA joints also synchronized with the angle changes to assist in balance recovery throughout the trial.

During the period after a perturbation, the torque profile deviated from the values observed during normal walking to accommodate the sudden perturbation. For example, at approximately 8.38 s, both of the HAA joints of the exoskeleton 10 offered assistive torque to help the subject shift his weight to recover balance. Similarly, at 10.64 s, both HAA joints generated assistive torque to help the subject broaden his step width to retain balance.

Figure 23:
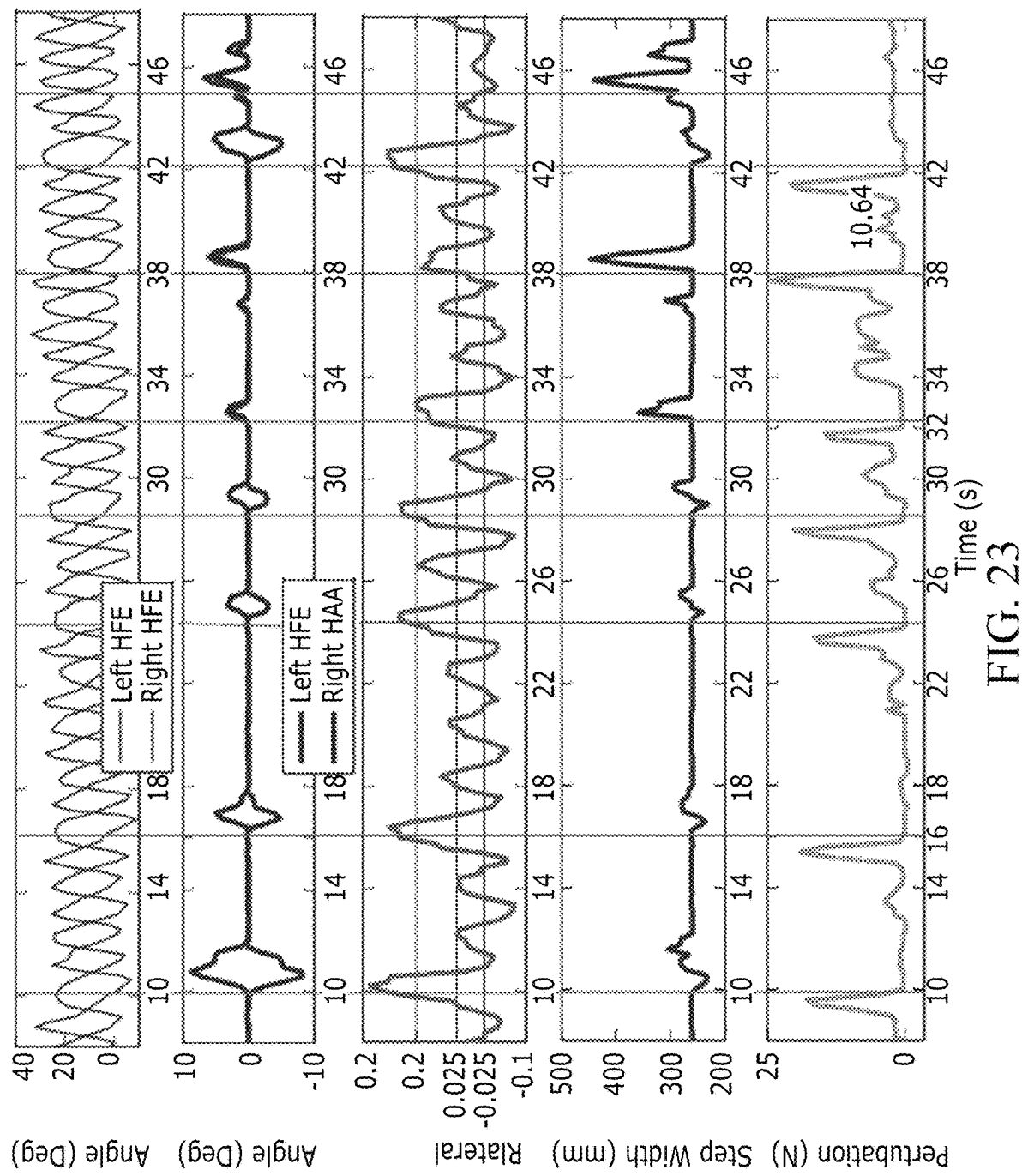
FIG. 23 illustrates results from walking with perturbations during Experiment 1.
Figure 23:
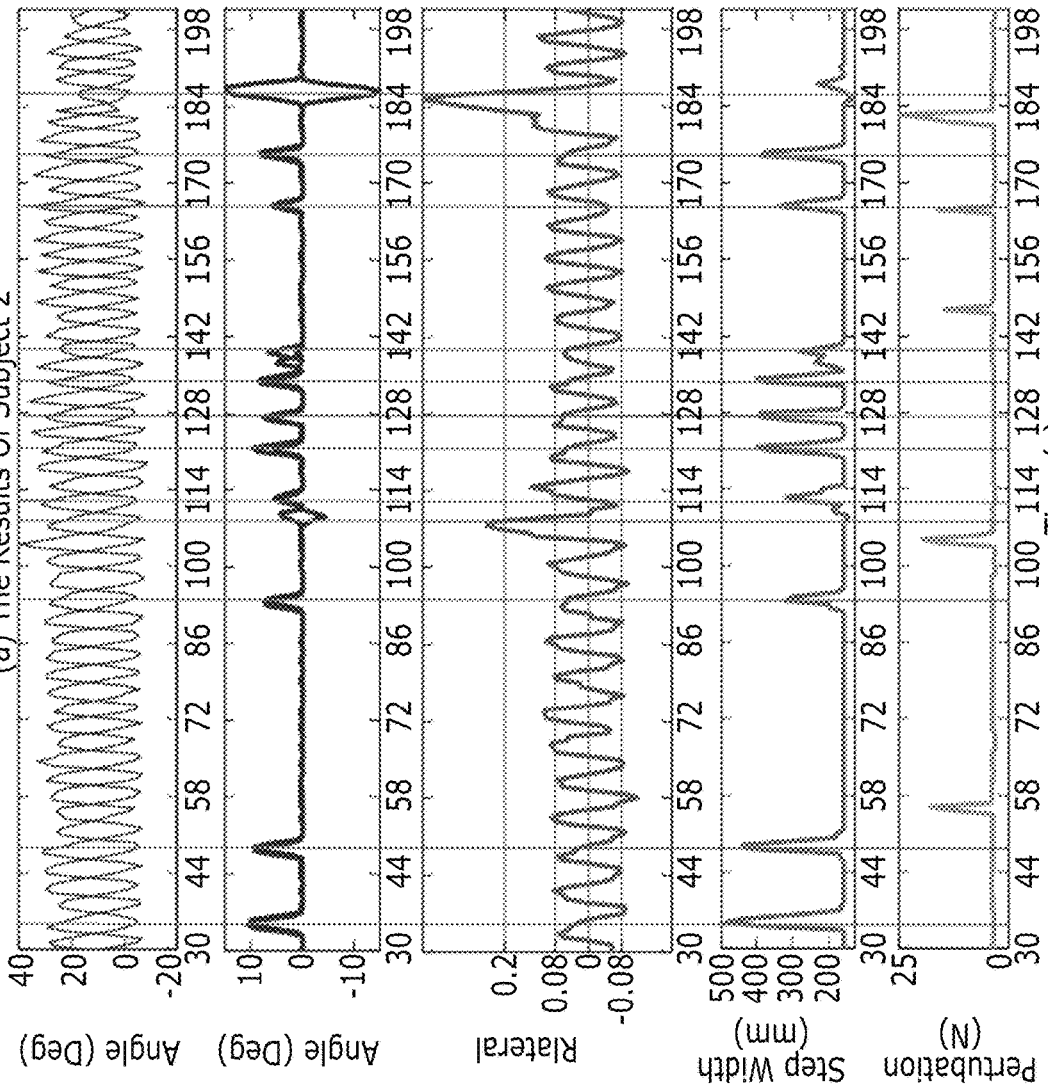
Figure 25:
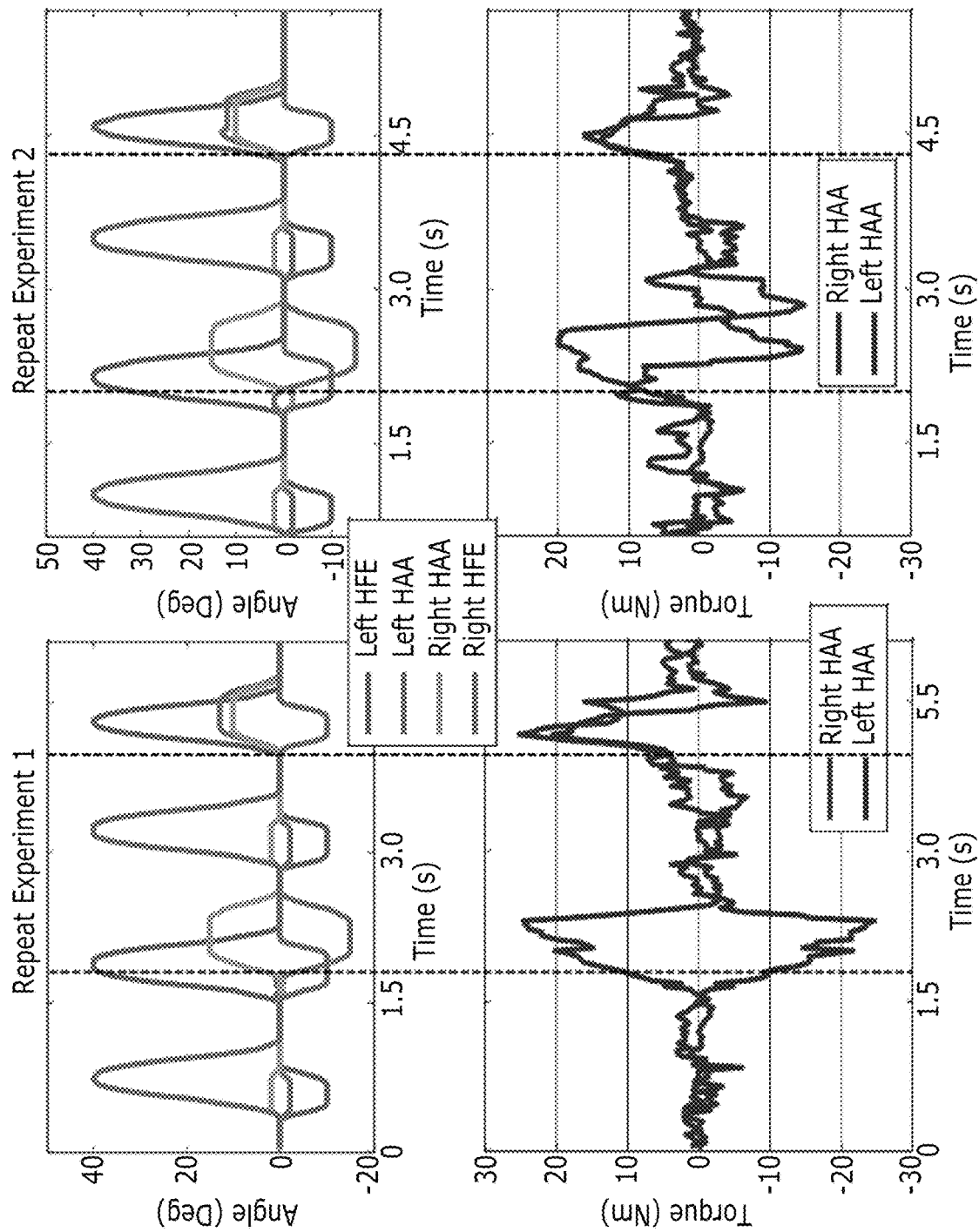
FIG. 25 compares the results of Experiment 1-III-1 and Experiment 1-III-2.

Experimental evaluation of the controller—results of experiment 1-II. The experimental results from a representative trial are shown in FIG. 23. For the subject 2, the weight shift ratio in the sagittal plane, $r_{lateral}$, remained within a range with an upper threshold of 0.1 and a lower threshold of 0.025 during the left-leg swing, whereas $r_{lateral}$ remained within a range between an upper threshold of −0.025 and a lower threshold of −0.1 during the right-leg swing. The thresholds of subject 3 are ±0.08 and ±0.2. The perturbations were recorded at experiment 1-II.

FIG. 24 summarizes the controller performance in controlling the peak HAA angles, peak step width, peak weight shift, as well as the peak amount of deviation of $r_{lateral}$ from the preset thresholds of the each perturbation profiles. For the subject 2, the perturbations 1, 2, 3, 4, and 7 were applied on the swing leg side during the right leg single support gait phase, the exoskeleton 10 assist shift weight to swing leg side to help subject to balance recovery; the perturbations 5 and 6 were applied on the support leg side during right leg single support gait phase and the perturbation 8 was applied on the support leg side during left leg single support gait phase, the exoskeleton assist to broaden step width to help subject to balance recovery. The result shows that HAA adjustments were correlated with the amount of deviation of $r_{lateral}$ from the preset thresholds. For example, at perturbation 1 (about 10 s), the deviation of $r_{lateral}$ from the preset threshold was about 0.1 with corresponding left and right HAA angles of about −9/9 degrees, while the HAA angles were −6/6 degrees when the deviation of $r_{lateral}$ from the preset threshold was 0.05 at perturbation 2 (about 16 s). For the subject 3, the perturbations 4 and 12 were applied on the swing leg side during the right leg single support gait phase, while other perturbations were applied on the support leg side during left leg single support gait phase. At perturbation 1, the deviation of natural from the preset threshold was about 0.04 with corresponding step width of about 480 mm, while the step width was 300 mm when the deviation of $r_{lateral}$ from the preset threshold was 0.02 at perturbation 3. At perturbation 4, the deviation of $r_{lateral}$ from the preset threshold was about 0.05 with corresponding weight shift of about 12 degrees, while the weight shift were 16 degrees when the deviation of $r_{lateral}$ from the preset threshold was 0.05 at perturbation 12. The HAA angles weren't zero during the double-support gait phase, which differed from the results in FIG. 10 due to equilibrium angle changes in the finite-state-machine.

Experimental evaluation of the controller results of experiment 1-III. Two representative trials for this experiment set are shown in FIG. 40. In both trials, the same perturbations were given from the swing and stance sides at the second and fourth gait cycles, respectively. Although the resulting angles were nearly identical, the HAA interaction torque profiles changed to adapt to the mechanical demands of the subject. For the first perturbation, the peak assistance torque for Experiment 1-III-1 was 25 Nm while the peak assistance torque for repeat Experiment 1-III-2 was 20 Nm. For the second perturbation, the peak assistance torque at Experiment 1-III-1 was 25 Nm while the peak assistance torque at Experiment 1-III-2 was 16 Nm.

As discussed herein, the exoskeleton 10 aims to assist individuals with some mobility. HAA and HFE joints on both limbs include powered actuators to actively maintain balance in the sagittal and frontal planes. SEAs are employed in actuation modules, and the powered joints are designed based on admittance control. This allowed the device to achieve passive and software-controlled active compliance when interacting with the wearer. The powered HAA joints are actively controlled using the XCoM concept, assisting with changes in step width and lateral weight shift. Our preliminary results show the promise of our device to improve lateral stability.

The exoskeleton 10 can assist a wide range of individuals, such as older adults or those with moderate neurological deficits, who have muscular weakness but retain a certain level of voluntary motor control of their lower limbs. The control in the frontal plane is flexible and can be adjusted based on each subject's unique physical ability. This can be seen in our results for experiments I and II in which the controller provided timely and effective assistance for balance recovery in the frontal plane for different controller sets.

The exoskeleton 10 also considered the wearers' efforts to provide appropriate assistance during balance recovery based on an assist-as-needed strategy. FIG. 23 demonstrated that subjects' responses to lateral perturbations were not strongly correlated to the magnitude and timing of the perturbations. One explanation for this is that subjects may respond and recover differently to similar perturbations. The exoskeleton's 10 assistance depends on the subject's response. For example, the exoskeleton 10 will assist more with balance recovery when the subject makes little effort to recover balance on their own, and assist less when the subject makes a greater effort toward balance recovery. This was validated in Experiment 1 in which HAA assistance torques differed under similar angle profiles after perturbations. The balance recovery strategy continuously monitors the human-exoskeleton interaction in such a way that all four actuators achieve compliance and synergy with wearers. To do this, the applied actuator torque can be modified by varying the joint stiffness parameter, which acts based on the wearers' performance. Due to humans' adaptability and prediction for the perturbation, as well as the wearer's psychological variety, the balance recovery effort of the wearer for the same balance loss condition will be different. The exoskeleton 10 provides assist-as-need assistance which is safer and more effective for wearers who retain partial voluntary control.

Compared with other exoskeleton 10s that are currently used for patients with lower-limb disabilities and older adults, our device offers several structural advantages. First, the weight of the proposed exoskeleton 10 is lighter than 10 kg and can supply a continuous torque of 40 Nm for both HFE and HAA to support a walking speed of up to 0.647 m/s. The high-power design along with simultaneous HFE and HAA actuation allows our exoskeleton to be potentially suitable for individuals with more severe physical impairments. The exoskeleton 10's SEA-driven HAA joints can provide additional compliant assistive torque to broaden step width and shift weight to improve lateral stability. Furthermore, our SEAs include joint torque sensors to monitor the interaction torque between exoskeleton and wearer in realtime. The controller is applied with human-in-the-loop, which considers the interaction torque between the human and machine to adjust the assistance level.

Our findings indicated that actively assisting with lateral motion could potentially improve gait stability and reduce dependence on external balance aids such as crutches and walkers if the wearer maintains a certain level of active locomotion control. The controller in the exoskeleton 10 does not require the user to wear any additional electromyography (EMG) sensors in quantifying human-robot interaction, is computationally efficient, and does not require any calibration. Given these advantages, the device could be practical for daily-life scenarios where exoskeletons are expected to provide the most benefit for wearers.

Experiment 2 was conducted using the exoskeleton of FIGS. 1-9 for back support. To address this issue, the exoskeleton 10 is designed to reduce lumbar compression by reducing the need for muscular activity in the spine. To provide effective assistance and avoid twisting muscle or tendon, we aim to apply a continuous torque of approximately 40 Nm on the hip joints on the both sagittal and frontal planes. Our prototype lower-back exoskeleton transfers assistive forces onto the thighs and torso. The four modular actuation units are approximately aligned with the hip on both the sagittal and frontal sides. Both powered hip abduction/adduction (HAA) and hip flexion/extension (HFE) joints reduce lumbar spinal loading due to lifting while in a twisting posture or losing balance during squatting. Each actuation unit employs a modular and compact series elastic actuator (SEA) with a high torque-to-weight ratio. It provides mechanical compliance at the interface between the exoskeleton and the wearer. Furthermore, the clutches are interpreted in the modular SEA, which can automatically disconnect the torque between the exoskeleton and the human to ensure safety.

Figure 26:
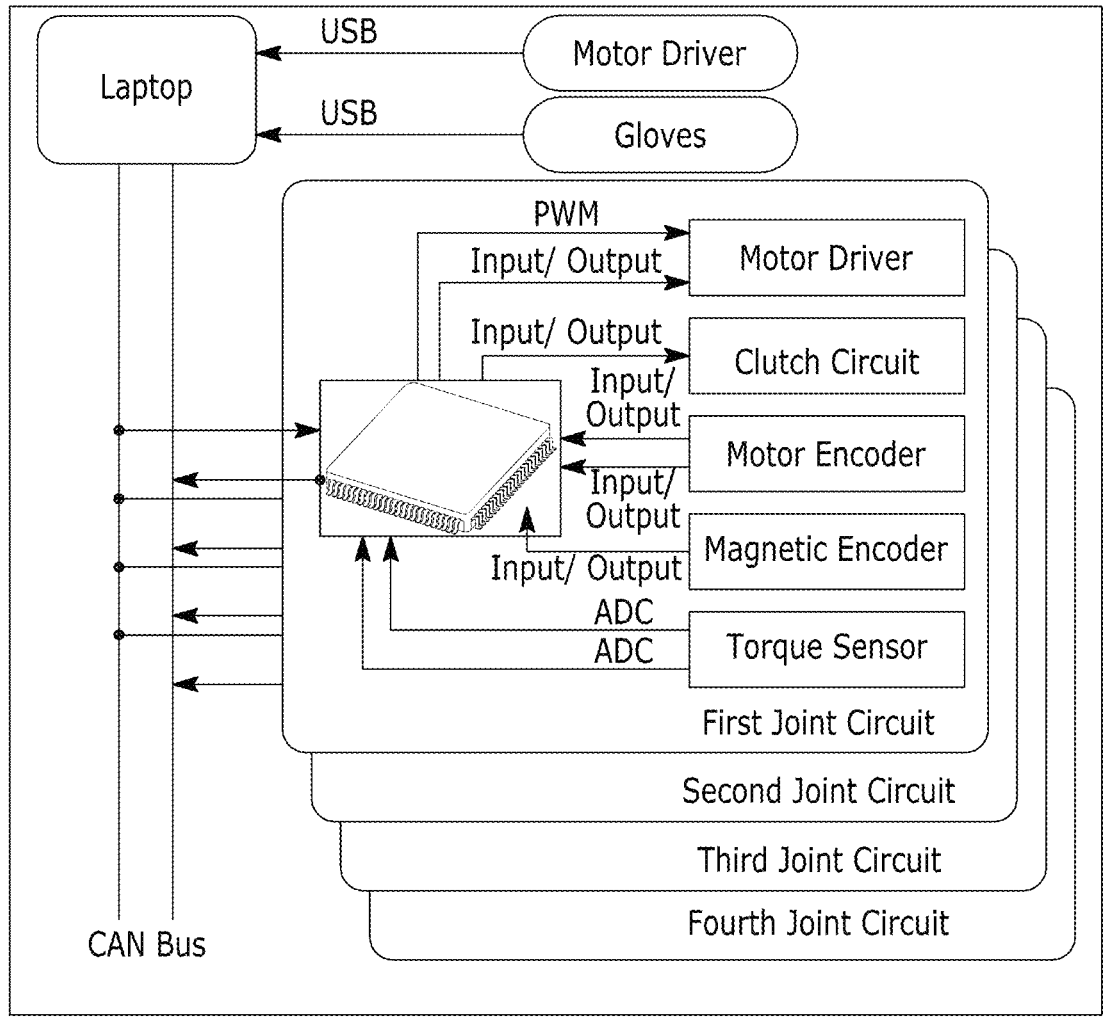
FIG. 26 is a schematic of the electrical hardware structure of the exoskeleton used for Experiment 2.

The electrical system 600 of the exoskeleton of FIGS. 1-9 was slightly modified as identified in FIG. 26. Notably, the system includes an incremental encoder in addition to the magnetic encoder 604 and an input from gloves 608. Despite this slight design change, the electrical system 600 works similarly to that discussed above for FIG. 14. That is, the control system 600 consists of a high-level sub-system, which runs an assistive control that allows the executor of the whole assistance, and four joint low-level sub-systems, which implements an admittance control.

The low-level controller is based on admittance control as shown in Equation 9:

$$\theta_{adj} = \theta_0 - \frac{1}{K + sD}\tau \tag{9}$$

where $$\frac{1}{K + sD}\tau$$

is the angle related to the interaction torque $\tau$ between the exoskeleton and the wearer's joint. This angle is estimated using the virtual impedance parameters D and K of the exoskeleton, and it increases or decreases proportionally to the interaction torque between the wearer and the exoskeleton. An increase in the interaction torque indicates a greater difference between the trajectory of the wearer's limb and the trajectory of the exoskeleton.

The variation in stiffness can be determined based on the performance of the wearer and the level of assistance to be exerted by the exoskeleton as given in Equation 10:

$$\begin{cases} K_{T+1} = K_T + \Delta K \\ \Delta K = \frac{\theta_0 - \theta}{\varepsilon\tau} \end{cases} \tag{10}$$

where $\varepsilon$ is a confidence factor in the interval [0,1], which is used to determine the stiffness to be applied at sample time T+1. A low confidence factor means that partial or complete assistance should be provided, whereas a higher confidence factor indicates that the subject is capable of lifting and lowering with little or no assistance.

As implemented in the high-level controller, a finite-state machine governs the work behavior of the exoskeleton. During normal assistive handling, the exoskeleton is controlled by a high-level control scheme based on a finite-state machine and a low-level control scheme based on admittance control. Three states are defined for assisted handling: no loading, lifting, and lowering. Each state consists of parameters describing the impedance of the four hip joints, including the joint stiffness (K), damping (D), and equilibrium angle ($\theta_0$), as well as transition criteria. During operation, the states are concatenated to produce seamless assistance behavior.

Figures 27, 28:
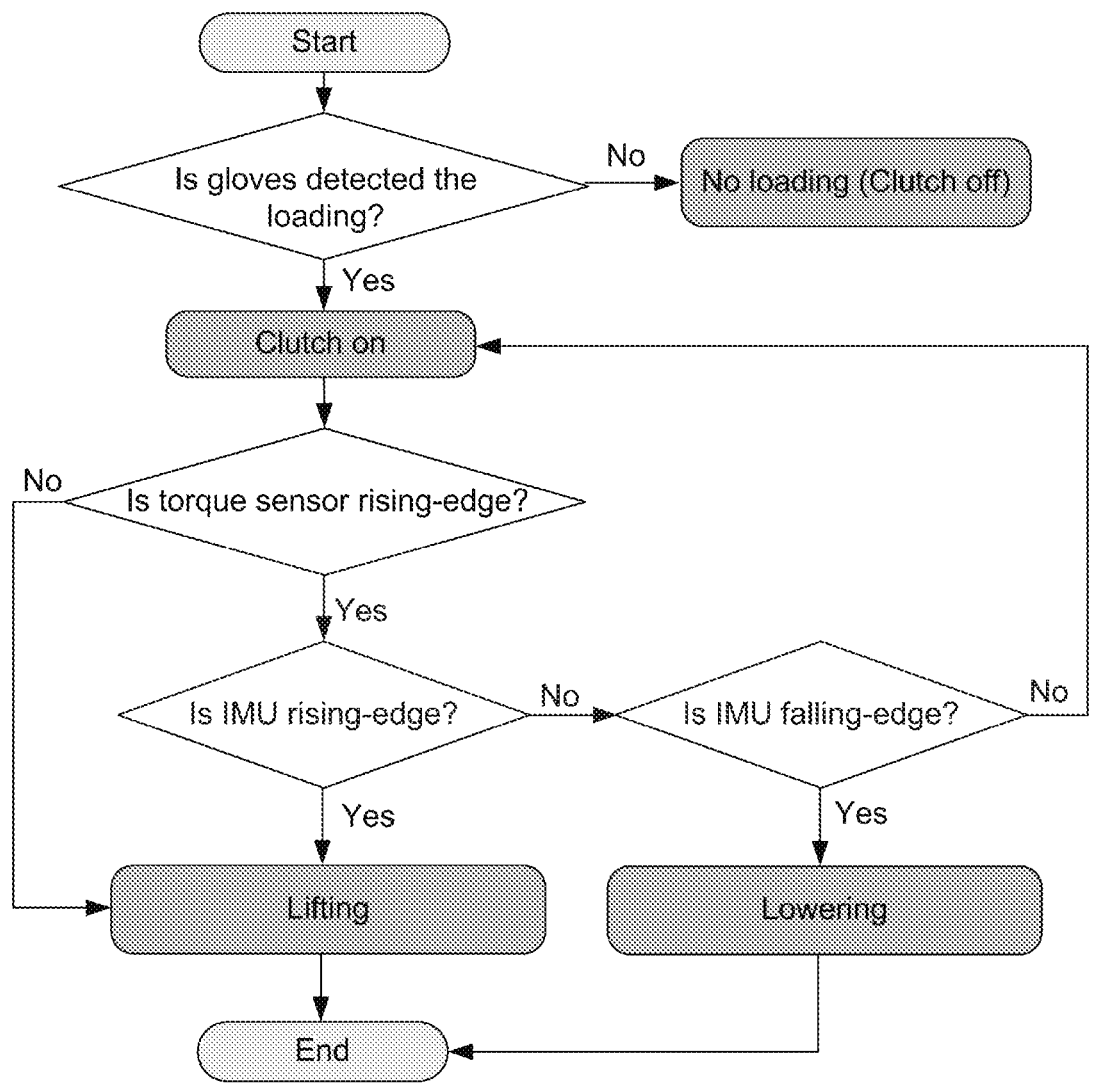
FIG. 27 is a flowchart of the assistive control strategy scheme for Experiment 2.
FIG. 28 is a table of each exoskeleton work status as reported during Experiment 2.

FIG. 27 shows the flowchart of the assistive strategy scheme. The finite-state machine uses the outputs from an inertial measurement unit (IMU) (VN-100S, Vectornav Embedded Navigation Solutions, Texas, USA), joint torque sensors, and pressure sensor (FSR 402, Interlink Electronics, USA) in a customized glove to transition between the 3 finite states of the state machine. We use the gloves' integrated force sensors to detect a load in the user's hand. When the gloves detect a load, the joints' clutches are engaged, and the exoskeleton will detect either a lifting or lowering task from the IMU and joint torque sensor readings. When the HFE joint torque sensors are rising-edge (i.e. the HFE joints' torque are increased duo to the increment of weight) and the IMU is falling-edge (i.e. increasing pitch angle), the finite state is lifting. When the HFE joint torque sensors are rising-edge and the IMU is rising-edge, the finite state is lowering. In addition, when the HFE joint torque sensors are falling-edge, the finite state is lifting. While the HFE joint torque sensors are falling-edge, the finite state is lifting. FIG. 28 shows the control parameters of each state. The stiffness in the FIG. 28 is the initial value; it will be adjusted in real time during the work.

Performance of the Powered Lower Back Exoskeleton

A healthy male subject participated in this study to evaluate the developed exoskeleton. The subject had no previous experience in using the exoskeleton. Experiment 2-I was performed to demonstrate the capacity of the exoskeleton to assistance lifting and lowering tasks. Experiment 2-II aimed to evaluate whether both HAA and HFE assistance can be helpful for an asymmetric lifting-lowering task. The experiment required participants to lift and then lower the object. The lifting-lowering tack was controlled at 2 s with a metronome. The subject performed this lifting and lowering motion for 5 sets, with 20 repetitions each. All repetitions were separated by approximately 5 min of rest. The subject was asked to choose a comfortable horizontal distance between his feet, provided it did not exceed 40 cm. The subject was not allowed to move his feet during the experiment because the direction of the pelvis might influence the lateral flexion and torsional torques. The subject was not allowed to move his feet during the experiment because the direction of the pelvis might influence the lateral flexion and torsional torques.

To verify the capacity of the developed exoskeleton to ease the effort of the subjects during lifting and lowering tasks, EMG was collected from injury-prone lower back muscle groups: left lumbar erector spinae, right lumbar erector spinae, left thoracic erector spinae, and right thoracic erector spinae muscles to provide an estimate of general back muscle activity. Raw EMG signals were collected using a Delsys Bagnoli-8 system (Natick, MA, USA) with a gain of 1000 at a sampling rate of 1000 Hz. For each lifting-lowering task, the start and end of the task were used to normalize each lifting-lowering motion to 0% to 100%. For a statistical comparison, integrated electromyography (iEMG) was used to evaluate muscles fatigue, which has already been used in previous work to evaluate muscle fatigue. All EMG were normalized to maximum EMG activity and then integrated with respect to the lifting-lowering task Experiment 2-I: Symmetric Lifting-Lowering Task The experiments were performed on a human subject using loads of 0 kg, 5 kg, 15 kg and 25 kg. The subject was asked to lift the box from floor to an erect standing posture and then lower it. The box had dimensions of 80 cm×45 cm×25 cm (width×depth×height) and was filled with weights to achieve the desired weight (5, 10 and 15 kg). The mass distribution of box is symmetric.

The subject lifted the box from the floor (the handles are 25 cm above the floor) in front (mid-sagittal plane, 0 degree) 72 cm high and then lowered it to the floor, which was approximately the height of person's knuckles when his arms hung vertically in a standing position.

Figure 29A:
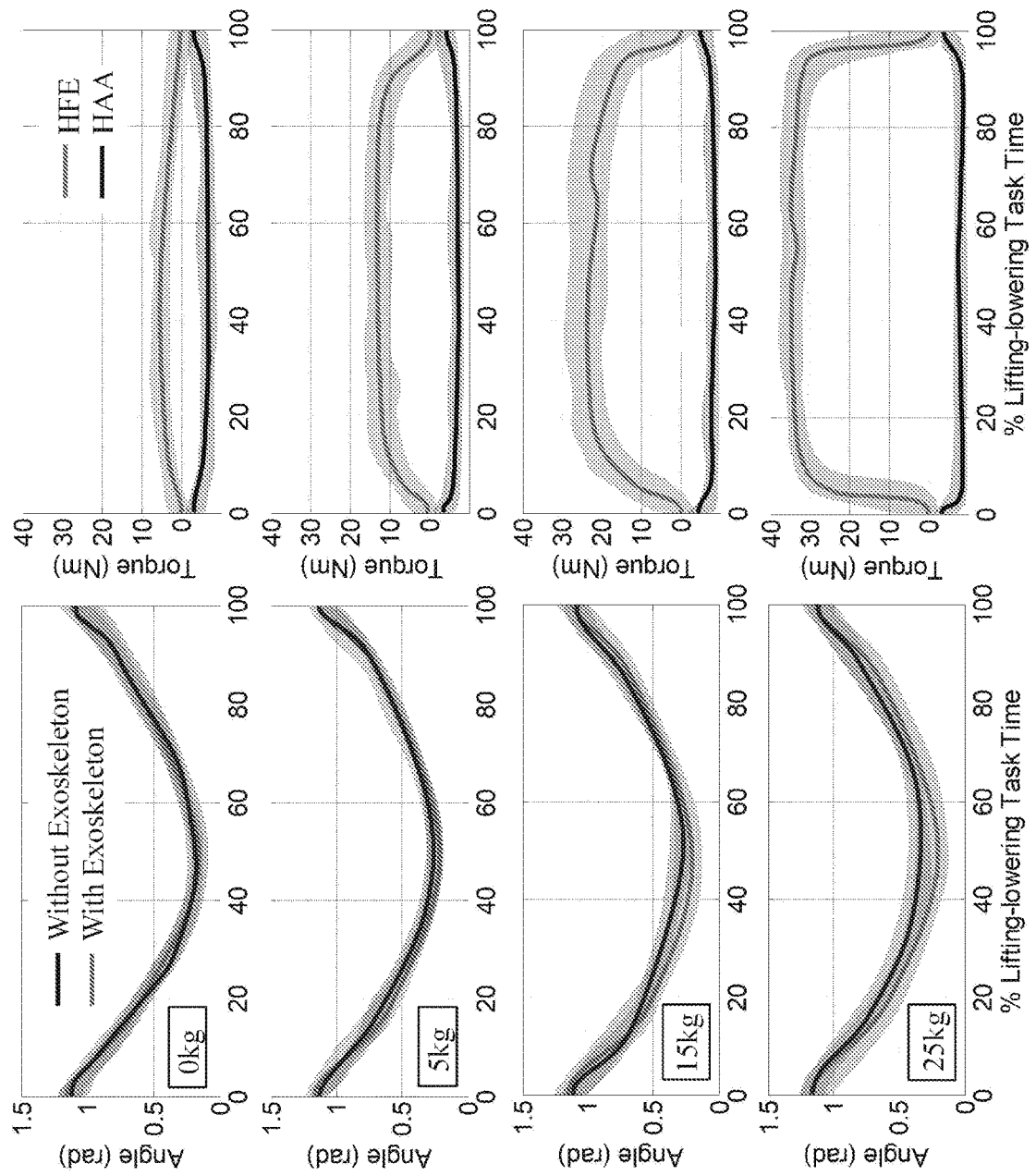
FIGS. 29A-C illustrate the results of a lifting-lowering task of Experiment 2.

FIG. 29A shows the kinematic analysis (joint angles) and dynamic analysis (assistance torque) results of both HAA and HFE joints during lifting-lowering scenarios. The angle profile of all cases remains almost the same with slight variations. The minimum HFE angle at the erect standing posture is around 0.2 rad. The velocity profile of all cases remains almost the same with slight variations. From the angle plot and torque plots, we can see that during lifting and lowering, the assistive torques at the HFE joints was positive. The assistive torques angles are well aligned. In both the lifting and lowering tasks, the exoskeleton provided assistance to help the wearer accomplish the task. The assistive torques varied with the box weights. The HAA joints provided a small amount of assistive torque during the symmetric lifting-lowering task.

Figure 29B:
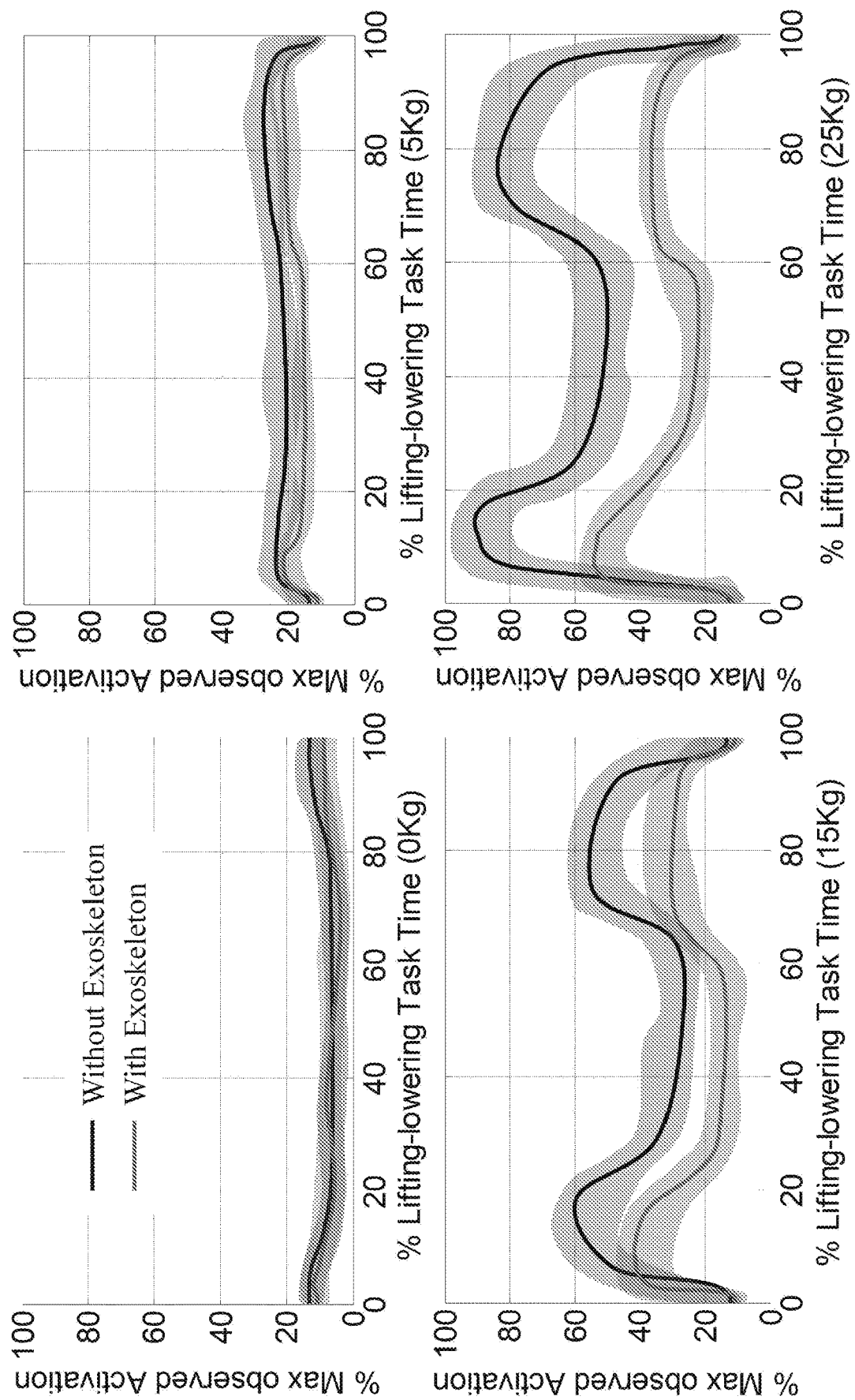
Figure 29C:
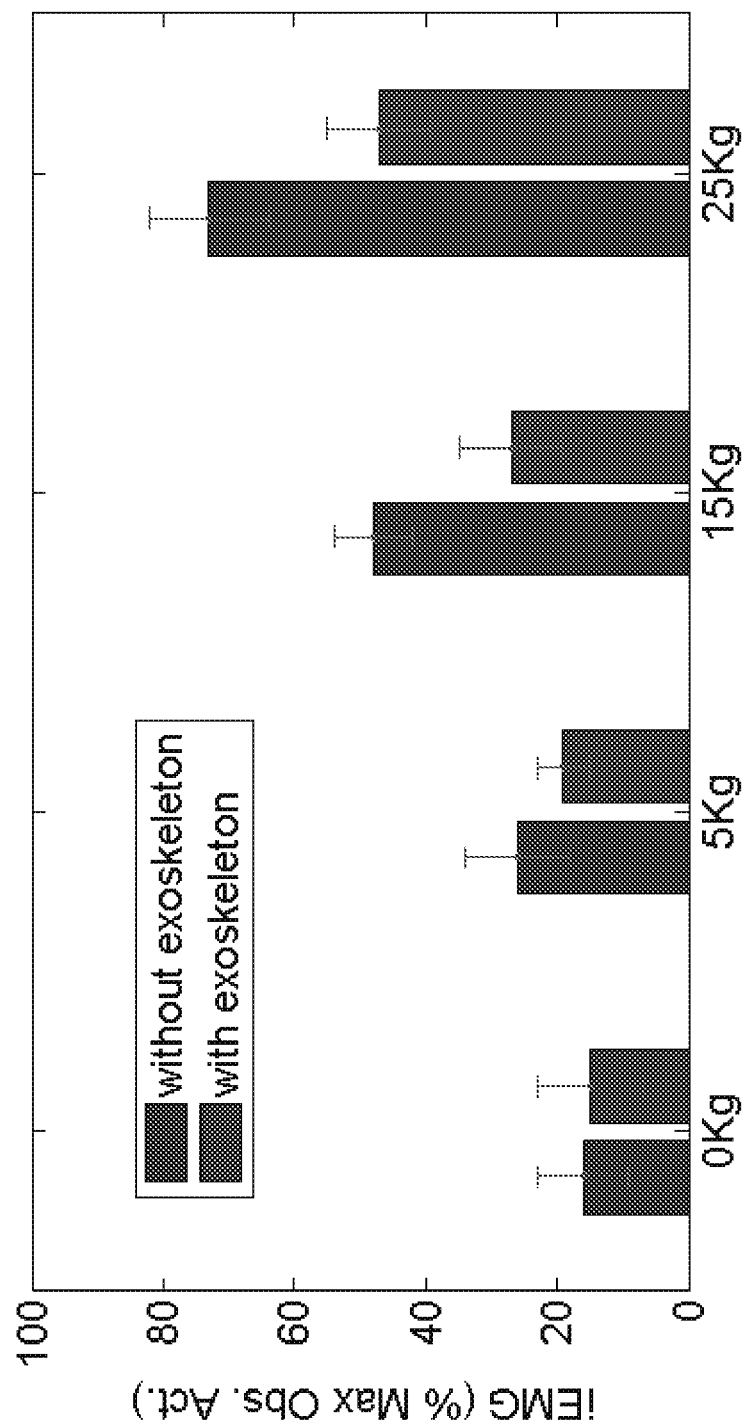

FIG. 29B and FIG. 29C shows the mean EMG for lifting and lowering 0 kg, 5 kg, 15 kg and 25 kg. When wearing the lower-back robotic exoskeleton, lower-back muscle fatigue (iEMG) was reduced from 16%±7%, 26%±8%, 48%±8%, 73%±4% to 15%±6%, 19%±8%, 27%±9%, 47%±8% for the 0 kg, 5 kg, 15 kg and 25 kg lowering-lifting tasks, respectively. The results demonstrated that the proposed lower-hack robotic exoskeleton significantly reduced lower-back muscle activity during symmetric lifting-lowering task.
Experiment 2-II: Asymmetric lifting-lowering task Experiment 2-II: Asymmetric Lifting-Lowering Task The experiments were performed on a human subject to asymmetrically lift a plastic box from the floor to an erect standing posture and to then lower to the original position with stoop style. The loads were positioned at 45o approximately 15 cm from the body. The box had dimensions of 80 cm×45 cm×25 cm (width×depth×height) and was filled with weights to achieve the desired weight (15 and 25 kg). The subject performed the lifting-lowering task under three conditions: without exoskeleton, with the exoskeleton but without HAA joints assistance, and with the exoskeleton with both HFE and HAA joint assistance.

Figure 30A:
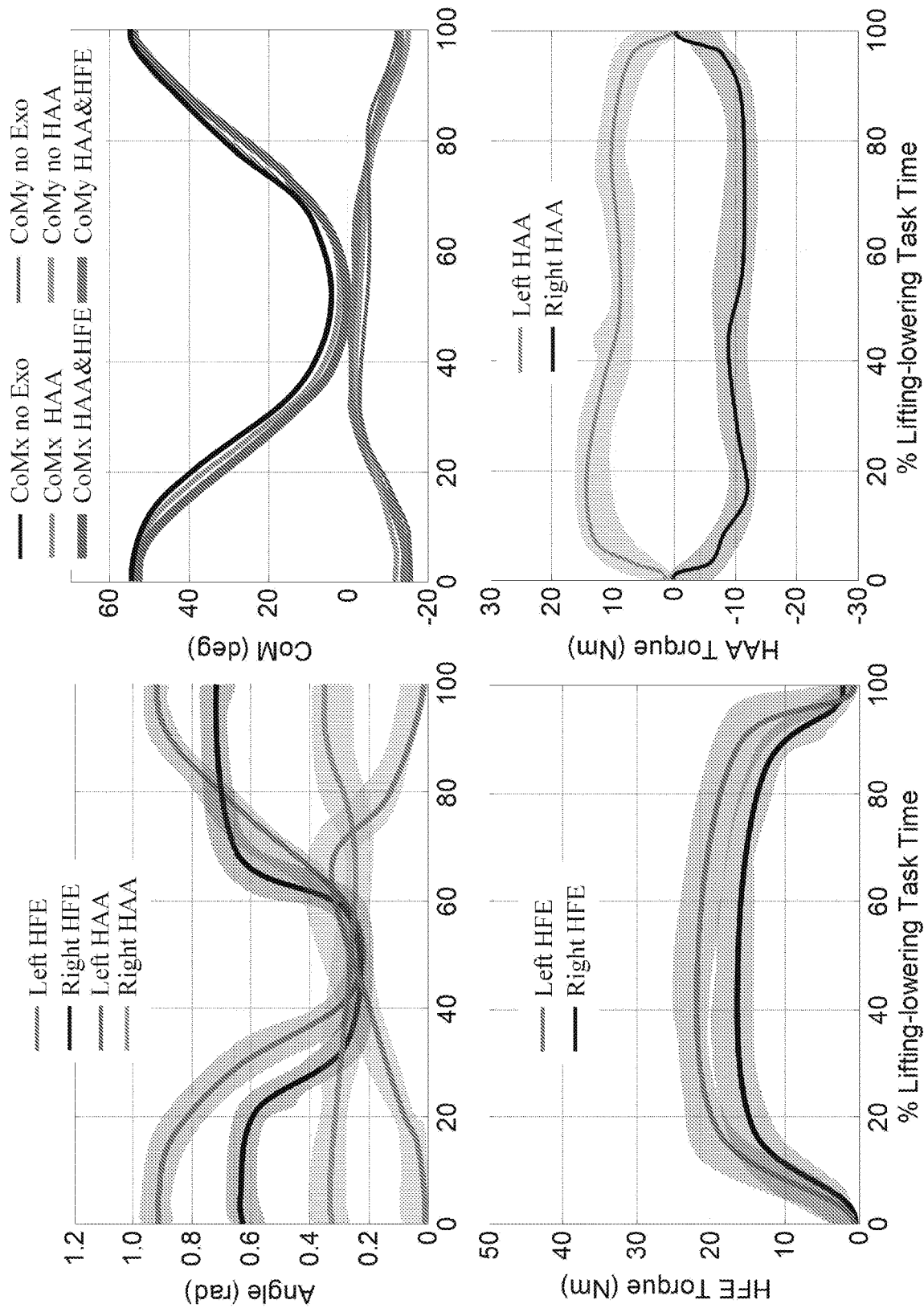
FIGS. 30A-E illustrate the results of an asymmetric lifting-lowering task of Experiment 2.
Figure 30B:
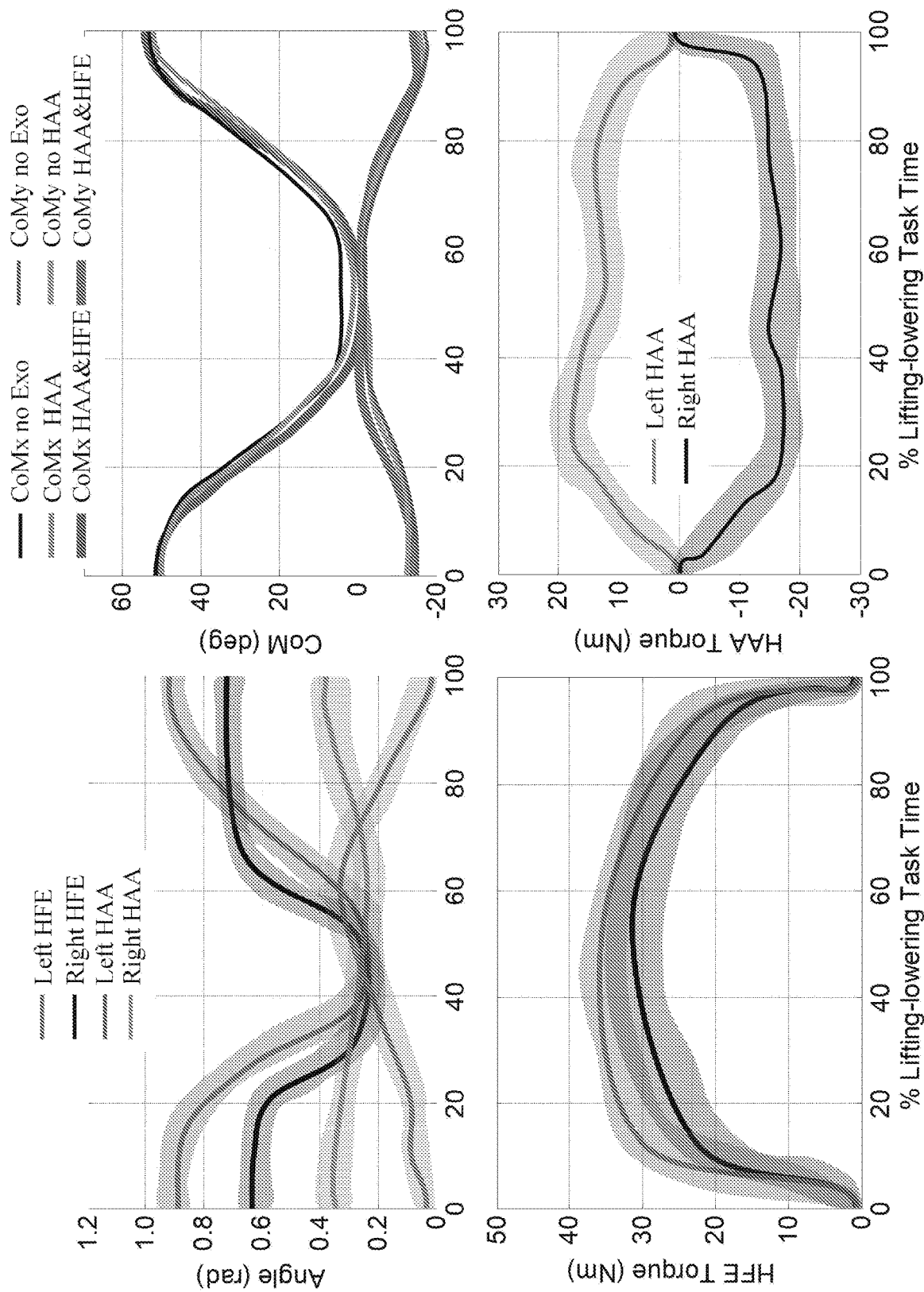

FIGS. 30A-E show the experimental results, Unlike Experiment 2-I, the HAA joints also provided assistive torque to keep the lifting-lowering task symmetric. FIGS. 30(a) and 30(b) are kinematics and dynamics for 15 kg and 25 kg, respectively. To show kinematic variety, we plotted the hip angle, torque, and mean center of mass (CoM) for three task conditions: without exoskeleton (no Exo), with only HFE assistance, and with both HFE and HAA assistance. From these CoM plots, we can see that the CoM is tilted to the left (CoM is negative), and the HAA joints provide assistance to help the wearer shift his weight toward symmetry. The torque plots show that the exoskeleton HAA joints provide assistive torque to help the wearer shift his weight from the right to left side to achieve and maintain symmetry.

Figure 30C:
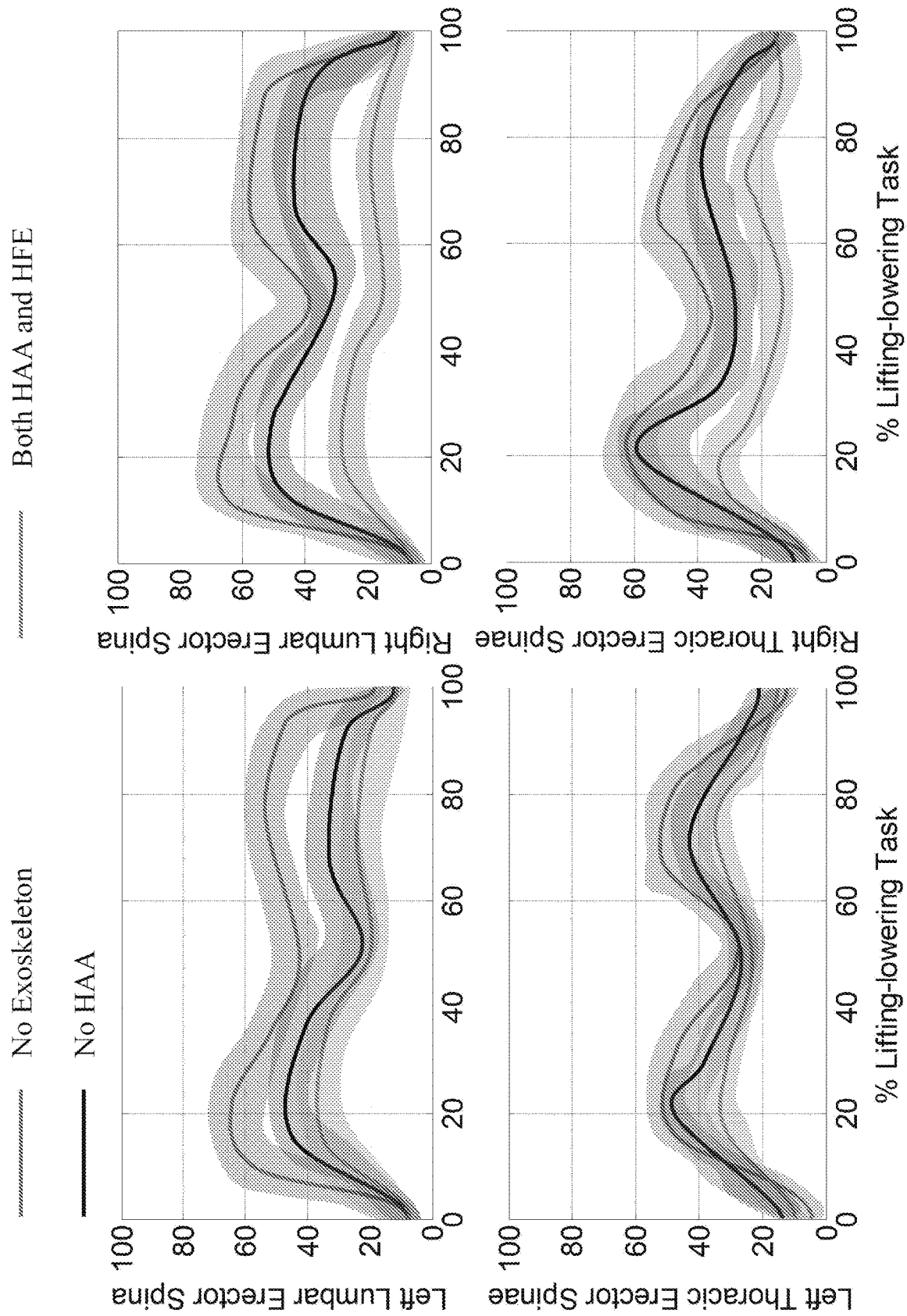
Figure 30D:
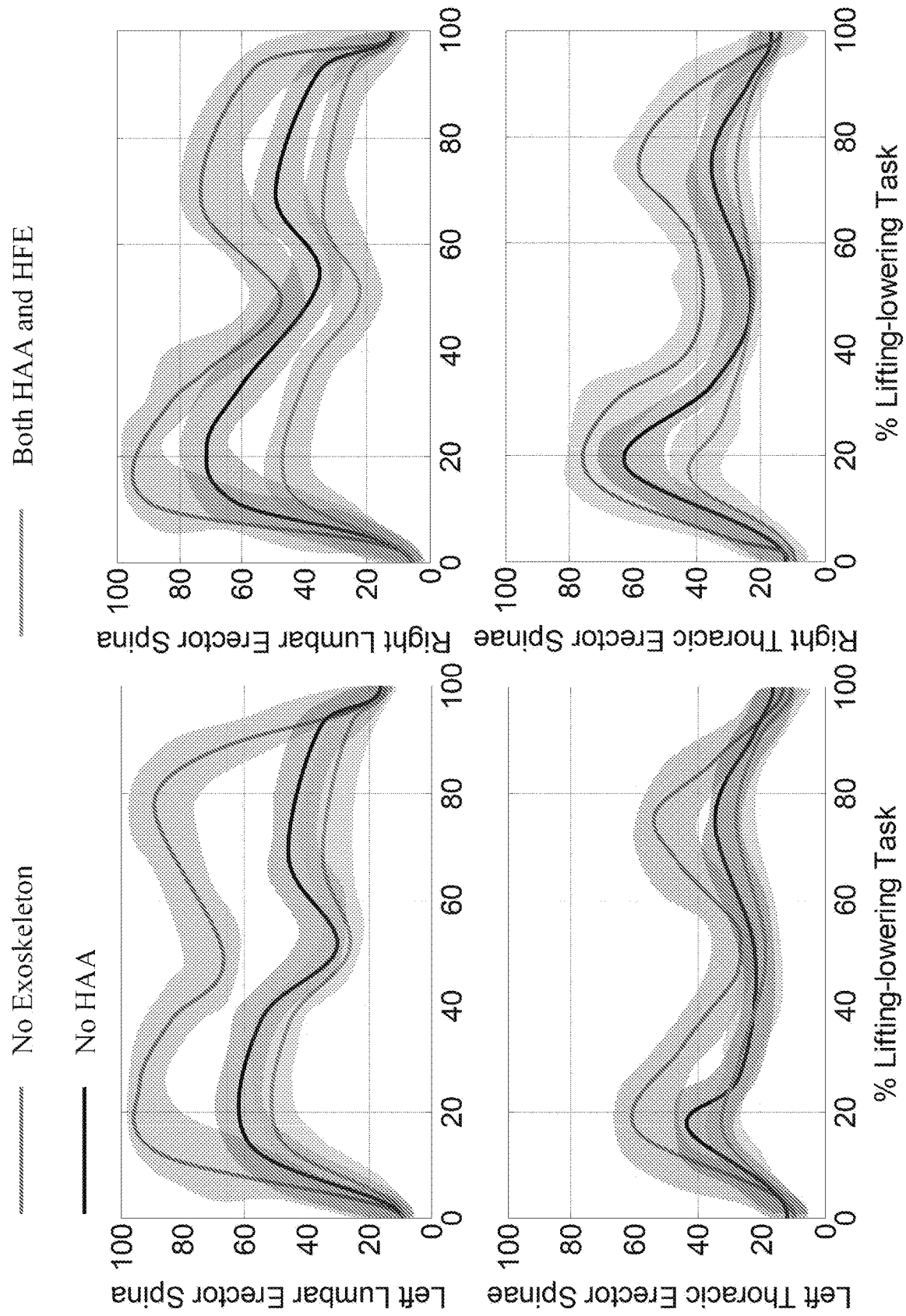
Figure 30E:
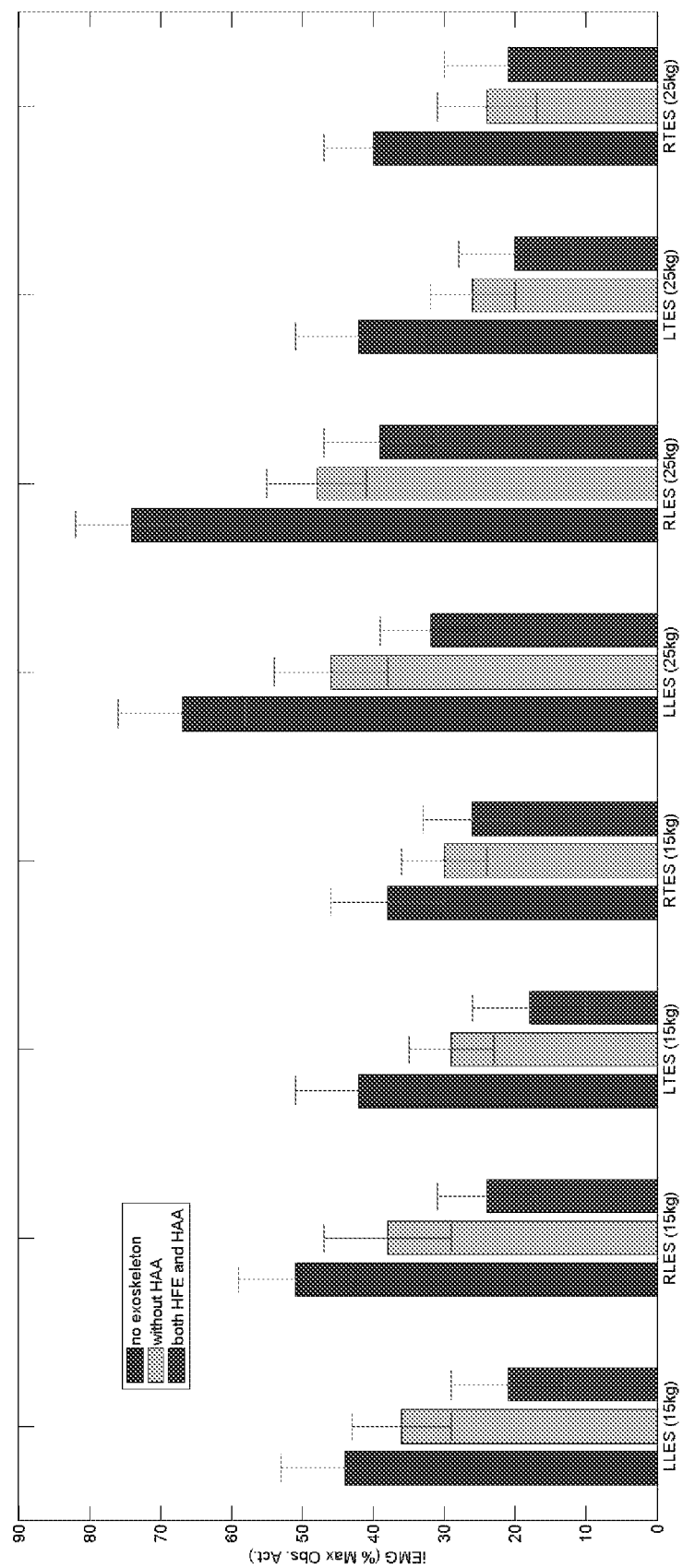

FIGS. 30C and 30D shows the mean EMG during the lifting-lowering task under three conditions. Dependent variables (left lumbar erector spinae, right lumbar erector spinae, left thoracic erector spinae, and right thoracic erector spinae muscles for 15 kg and 25 kg with three different task conditions) were expressed as means and standard deviations. For all asymmetric lifting-lowering tasks, greater reductions in muscle activity (iEMG) were observed with both HFE and HAA assistance, compared to HFE assistance only. An example is shown in FIG. 30(e), where the iEMG of the left lumbar erector spinae were measured at 51%±9%, 38%±7%, and 24%±8% without exoskeleton, with HFE assistance, and with both HFE & HAA respectively.

Experiment 2 shows that the exoskeleton has powered HAA and HFE joints that can reduce lumbar spinal loading due to lifting while in a twisting posture or losing balance during squatting. SEAs are employed in actuation modules, and the powered joints are designed based on admittance control. This allows the device to achieve passive and software-controlled active compliance when interacting with the wearer.

Compared with other powered lower-back exoskeletons that are currently used for industrial handling, this device offers several structural advantages. First, the proposed exoskeleton can supply a continuous torque of 40 Nm and maximum joint velocity of 150 deg/s for both HFE and HAA joints. The high-power design along with simultaneous HFE and HAA actuation allows the exoskeleton to be potentially assistive to workers lifting, lowering, and carrying heavy objects. Furthermore, the high-power supports the capacity of the lower-back exoskeleton to connect with other exoskeleton models, such as tool holding, power gloves, and upper-limb exoskeletons, to expand its application in industry and the workplace.

Further, the exoskeleton adopts a clutch in the modular SEA that can automatically disconnect the torque between exoskeleton and human to ensure safety.

Three industrial scenarios are considered based on frequent manual handling tasks: lowering, lifting, and carrying. This paper evaluates the lowering and lifting tasks. For the carrying task, the worker will have a risk of falling due to carrying the weight of the object. In the biomechanics of human locomotion, the control of foot placement in both the mediolateral and anteroposterior directions has long been recognized as an effective mechanism for maintaining bipedal gait stability. During walking, in addition to the forward step length regulated by hip flexion/extension (HFE), the adaptation of the step width, which can be adjusted by hip abduction/adduction (HAA) motions, is crucial for walking stability. Our previous studies on rehabilitation have shown that when an exoskeleton has both powered HFE and HAA joints, it can adjust step-length and step-width in real time to provide stability while walking.

Although the invention has been described in detail with reference to certain preferred embodiments, variations and modifications exist within the scope and spirit of one or more independent aspects of the invention as described.

Various features and advantages of the invention are set forth in the following claims.

What is claimed is:

1. An exoskeleton wearable on a body of a human having two legs, the exoskeleton comprising: a first HAA joint and a second HAA joint configured to assist the human with leg abduction and adduction movements at a hip of the body, wherein the leg abduction and adduction movements are parallel to a frontal plane, each of the first and the second HAA joints having an actuator, each actuator including a low-level controller, a motor, a torque sensor, and a clutch, the low level controller configured to calculate an interaction torque that represents a difference between a trajectory of a respective leg of the two legs and a trajectory of the respective first HAA joint or the second HAA joint using data sensed by the torque sensor, wherein the interaction torque is a torque that exists between the exoskeleton and the human; a sensor system for measuring a combined center of mass of the human and the exoskeleton in the frontal plane and a step width of the human in the frontal plane; and a high-level controller that outputs adjustment angles for each of the first and the second HAA joints based on the center of mass and the step width; wherein the first and the second HAA joints are respectively rotated based on the respective output adjustment angles, and wherein the clutch of each actuator is configured to be selectively disengaged from the respective motor during rotation of the respective first HAA joint or the second HAA joint based on the calculated interaction torque, to disconnect the actuator from the respective first HAA joint and second HAA joint and allow the hip to function on its own under the influence of gravity; wherein each low-level controller is configured to control a rotation of the first HAA joint or the second HAA joint using both the adjustment angles output by the high-level controller and the interaction torque measured by the respective torque sensor of the first HAA joint or the second HAA joint.

2. The exoskeleton of claim 1, wherein each actuator includes a spring that has a double spiral disc shape and a stiffness of 2.15 Nm/degree.

3. The exoskeleton of claim 1, wherein the torque sensor is a spring-based torque sensor.

4. The exoskeleton of claim 3, wherein the spring-based torque sensor includes four strained beams, each having a rectangular groove.

5. The exoskeleton of claim 1, wherein the controller includes a high-level sub-system including the high-level controller and a low-level sub-system including the low-level controller, and wherein the high-level sub-system is controlled by a finite-state-machine and uses the combined center of mass of the human and the exoskeleton in the frontal plane and the step width of the human in the frontal plane to determine the adjustment angles for each of the respective first and the second HAA joints.

6. The exoskeleton of claim 1, further comprising a back support, a first leg support, and a second leg support, the first HAA joint being operatively coupled between the back support and the first leg support and the second HAA joint being operatively coupled between the back support and the second leg support.

7. The exoskeleton of claim 1, wherein the sensor system includes a foot-pressure sensor array, the foot-pressure sensor array configured to detect foot-ground contact events.

8. The exoskeleton of claim 1, wherein each actuator includes a transmission, wherein each clutch is a mechanical clutch configured to automatically disengage and engage the transmission.

9. The exoskeleton of claim 1, wherein each clutch is an electromagnetic tooth-type clutch.

* * * * *